US010496049B2

(12) United States Patent
Rao et al.

(10) Patent No.: US 10,496,049 B2
(45) Date of Patent: Dec. 3, 2019

(54) COMMUNICATION BETWEEN DISTRIBUTED INFORMATION BROKERS WITHIN A DATA AND ENERGY STORAGE INTERNET ARCHITECTURE

(71) Applicant: Futurewei Technologies, Inc., Plano, TX (US)

(72) Inventors: Lei Rao, Mountain View, CA (US); Jian Li, Austin, TX (US); Jiafeng Zhu, Pleasanton, CA (US); Ron-Chung Hu, Palo Alto, CA (US)

(73) Assignee: Futurewei Technologies, Inc., Plano, TX (US)

( * ) Notice: Subject to any disclaimer, the term of this patent is extended or adjusted under 35 U.S.C. 154(b) by 868 days.

(21) Appl. No.: 14/970,906

(22) Filed: Dec. 16, 2015

(65) Prior Publication Data

US 2017/0176955 A1    Jun. 22, 2017

(51) Int. Cl.
*G05B 13/02* (2006.01)
*H02J 3/00* (2006.01)
*H04L 12/26* (2006.01)

(52) U.S. Cl.
CPC .............. *G05B 13/026* (2013.01); *H02J 3/00* (2013.01); *H02J 2003/003* (2013.01); *H04L 43/08* (2013.01)

(58) Field of Classification Search
CPC .......... G05B 13/026; H04L 43/08; H02J 3/00; H02J 2003/003

(Continued)

(56) References Cited

U.S. PATENT DOCUMENTS

| 5,742,833 A | 4/1998 | Dea et al. |
| 5,924,486 A * | 7/1999 | Ehlers ................ G05D 23/1923 |
| | | 165/238 |

(Continued)

FOREIGN PATENT DOCUMENTS

| CN | 101718988 A | 6/2010 |
| CN | 102739751 A | 10/2012 |
| CN | 104571068 A | 4/2015 |

OTHER PUBLICATIONS

Katz, R.H., et al., "An information-centric energy infrastructure: The Berkeley view," Sustainable Computing: Informatics and Systems, journal homepage:www.elseviercom/locate/suscom, vol. 1, Issue 1, 2011, pp. 7-22.

(Continued)

Primary Examiner — Chun Cao
(74) Attorney, Agent, or Firm — Conley Rose, P.C.

(57) ABSTRACT

A method implemented in a network element (NE) configured to operate as an Ensemble Information Broker (EIB) within a distributed data and energy storage internet architecture comprising collecting energy data indicating a flow of energy, an amount of energy consumed and generated by devices; collecting human presence data; collecting human activity data; predicting future energy consumption requirements and generation by employing prediction algorithms and analyzing the collected data; generating a set of control commands based on the predicted future energy consumption requirements and energy generation as applied to a cost function; transmitting the set of control commands to the corresponding devices; transmitting a broadcast message to determine an external NE to establish as a friend connection based on a user preference; transmitting a request to establish a friend connection with the determined NE; and (Continued)

transmitting the human presence data to the external NE when the friend connection is established.

20 Claims, 14 Drawing Sheets

(58) Field of Classification Search
USPC .................................................. 700/275
See application file for complete search history.

(56) References Cited

U.S. PATENT DOCUMENTS

| | | | |
|---|---|---|---|
| 7,930,731 B2 | 4/2011 | Glasgow | |
| 8,511,576 B2 | 8/2013 | Warren et al. | |
| 8,630,741 B1 | 1/2014 | Matsuoka et al. | |
| 2004/0263116 A1 | 12/2004 | Doruk et al. | |
| 2007/0112613 A1 | 5/2007 | Jones | |
| 2009/0088907 A1 | 4/2009 | Lewis et al. | |
| 2010/0169446 A1* | 7/2010 | Linden ............... | G06F 11/181 709/206 |
| 2010/0179704 A1 | 7/2010 | Ozog | |
| 2010/0289643 A1* | 11/2010 | Trundle ............... | G08C 19/16 340/545.1 |
| 2011/0015797 A1 | 1/2011 | Gilstrap | |
| 2011/0046805 A1 | 2/2011 | Bedros et al. | |
| 2011/0047052 A1 | 2/2011 | Cornish | |
| 2011/0106321 A1 | 5/2011 | Cherian et al. | |
| 2011/0138458 A1* | 6/2011 | Kumar ............... | H04L 63/18 726/15 |
| 2011/0202217 A1 | 8/2011 | Kempton | |
| 2011/0264605 A1 | 10/2011 | Park et al. | |
| 2011/0276404 A1 | 11/2011 | Taysom et al. | |
| 2012/0066770 A1 | 3/2012 | Hayashi et al. | |
| 2012/0278220 A1* | 11/2012 | Chassin ............... | G06Q 40/00 705/37 |
| 2012/0296488 A1 | 11/2012 | Dharwada et al. | |
| 2012/0316688 A1 | 12/2012 | Boardman et al. | |
| 2013/0036311 A1 | 2/2013 | Akyol et al. | |
| 2014/0025218 A1* | 1/2014 | Nishi ............... | H02J 3/06 700/295 |
| 2014/0096126 A1 | 4/2014 | Gourlay et al. | |
| 2014/0172503 A1* | 6/2014 | Hammerstrom ... | G06Q 30/0206 705/7.31 |
| 2014/0236360 A1 | 8/2014 | Matsuoka et al. | |
| 2014/0277761 A1* | 9/2014 | Matsuoka .......... | G05D 23/1904 700/276 |

OTHER PUBLICATIONS

Dawson-Haggerty, S., et al., "BOSS: Building Operating System Services," Proceedings of the 10th USENIX Symposium on Networked Systems Design and Implementation (NSDI'13), Apr. 2013, pp. 443-457.
Ortiz, J., et al., Towards Real-time, Fine-grained Energy Analytics in Buildings Through Mobile Phones, 4th ACM Workshop on Embedded Systems for Energy-Efficient Buildings, Buildsys'12, Nov. 2012, Toronto, ON, Canada, Nov. 2012, pp. 42-44.
Choi, M., et al., "Attendance Check System and Implementation for Wi-Fi Networks Supporting Unlimited Number of Concurrent Connections," International Journal of Distributed Sensor Networks, vol. 2015. Article ID 508698, 10 pages.
Office Action dated Dec. 14, 2017, 22 pages, U.S. Appl. No. 15/057,665, filed Mar. 1, 2016.
Machine Translation and Abstract of Chinese Publication No. CN101718988, Jun. 2, 2010, 6 pages.
Foreign Communication From A Counterpart Application, PCT Application No. PCT/CN2016/108237, English Translation of International Search Report dated Feb. 16, 2017, 4 pages.
Machine Translation and Abstract of Chinese Publication No. CN102739751, dated Oct. 17, 2012, 30 pages.
Machine Translation and Abstract of Chinese Publication No. CN104571068, dated Apr. 29, 2015, 16 pages.
Foreign Communication From a Counterpart Application, Chinese Application No. 201680067300.9, Chinese Office Action dated Sep. 29, 2019, 14 pages.
Foreign Communication From a Counterpart Application, Chinese Application No. 201680067300.9, Chinese Search Report dated Sep. 21, 2019, 3 pages.

* cited by examiner

COMMUNICATION BETWEEN DISTRIBUTED INFORMATION BROKERS WITHIN A DATA AND ENERGY STORAGE INTERNET ARCHITECTURE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Intelligent control is important to managing computing systems and networks. Analytics and feedback may be employed to achieve multiple objectives by optimal scheduling and resource allocation, such as adjusting scheduling priorities, memory allocations, and network bandwidth allocations. Control theory encompasses a large body of practical, system-control-design principles and provides a systematic approach to designing closed loop systems that are stable in that they avoid wild oscillations, are accurate in that they achieve the desired outputs, and settle quickly to steady state values. Control theory is a branch of theoretical and applied mathematics and is employed in the design of many aspects of computing. Additionally, control theory is employed to analyze and design feedback loops in mechanical, electrical, aeronautical, and other engineering disciplines. As such, control theory has had a profound impact on the design and development of a large number of systems and technologies, from airplanes, spacecraft, and other vehicle and transportation systems to computer systems, industrial manufacturing and operations facilities, machine tools, process machinery, and consumer devices.

Together with inputs from human-machine interfaces, intelligent controls can analyze human preferences and behaviors to provide solutions tailored to each individual. Often an intelligent controller is tasked with controlling a single device or system under stringent constraints to achieve conflicting goals. Designers, manufacturers, and users of intelligent controls have been seeking solutions that effectively control systems while also coordinating with each other to enable better resource sharing and coordination.

SUMMARY

In one embodiment, the disclosure includes a distributed system comprising a plurality of network elements (NEs) configured to operate as Ensemble Information Brokers (EIBs) within a distributed data and energy storage internet architecture, wherein each NE is configure to collect device data regarding a flow of energy during a specified period of time through a plurality of devices within a smart system associated with the NE, an amount of energy and data consumed by the devices during the specified period of time, and an amount of energy and data generated by the devices during the specified period of time; collect human presence data in the smart system regarding a presence of a user within the smart system during the specified time; collect human activity data in the smart system regarding user inputs to the devices and user interaction with the devices during the specified period of time; determine future energy and data consumption and generation requirements for the smart system by applying prediction algorithms to the device data, the human presence data and the human activity data; generate a set of control commands for the devices within the smart system based on the future energy and data consumption and generation requirements as applied to a dynamic human-centric cost function associated with the smart system, wherein the dynamic human-centric cost function adapts to weighted objective metrics according to the human presence data, human activity data, and user defined preference levels for the smart system; transmit the set of control commands to the corresponding devices within the smart system; transmit a broadcast message to determine an external NE within an assigned environment or network and within the a distributed data and energy storage internet architecture to establish as a friend connection based on a user preference; transmit a request to establish a friend connection with the determined NE, wherein the friend connection is established upon a receipt of a confirmation from the external NE; and transmit the human presence data to the external NE when the friend connection is established. In some embodiments, each NE is further configured to to transmit a heartbeat message periodically to maintain a connection status with the external NE when the friend connection is established, and/or to receive external environment presence data from the external NE when the friend connection is established, and wherein the external environment presence data indication an interaction of a plurality of external users with a plurality of external devices within a an external smart systems associated with the external NE, and/or receive a request for energy or data storage at a specified time from a second external NE; determine an eligibility of a second external smart system associated with the second external NE based an eligibility algorithm determined by whether the second external NE has been established as a friend connection; and send a command to an electric producing device within the smart system to cause the electric producing device to provide an amount of energy or data generation satisfying the request for energy or data storage to the second external smart system at the specified time upon determining that the second external smart system is eligible to receive the amount of energy or data, and/or provide an interface to alter or enter values employed within the energy cost function and the user productivity function. In some embodiments, the disclosure also includes wherein the eligibility algorithm is a point-based credit scheme when the second external NE is not established as a friend connection, wherein the point-based credit scheme compares a sent amount of energy or data sent to an external smart system and a received amount of energy or data received from the external smart system, and wherein the point-based credit scheme comprises a weight function comprising a weight value determined based on a temporal distance between the specified time and a peak time for energy or data consumption within the smart system assigned to the NE, and/or wherein the eligibility algorithm is an established friend scheme when the second external NE is established as a friend connection, and wherein the established friend scheme determines that the second external smart system is eligible to receive the amount of energy or data when the second NE is established as a friend connection, and/or wherein the dynamic human-centric cost function comprises a human-centric multimodal representation of a weighted sum of an energy cost function and a user productivity function, wherein the energy cost function is a representation of an operating status of the devices, and wherein the user productivity function is a representation of a human comfort level and a human productivity level within the smart system and comprises a noise function, a cool function, a warm function, a fresh function, and a humidity function each regarding an operating status of the devices.

In another embodiment, the disclosure includes a network element (NE) configured to operate as an Ensemble Information Broker (EIB) within a distributed data and energy storage internet architecture, the NE comprising a processor configured to collect device data regarding a flow of energy during a specified period of time through a plurality of devices within a smart system associated with the NE, an amount of energy and data consumed by the devices during the specified period of time, and an amount of energy and data generated by the devices during the specified period of time; collect human presence data in the smart system regarding a presence of a user within the smart system during the specified time; collect human activity data in the smart system regarding user inputs to the devices and user interaction with the devices during the specified period of time; predict future energy and data consumption and generation requirements for the smart system by applying prediction algorithms to the device data, the human presence data, and the human activity data; and generate a set of control commands for the devices within the smart system based on the predicted future energy and data consumption and generation requirements as applied to a dynamic human-centric cost function associated with the smart system that adapts to weighted objective metrics according to the human presence data, human activity data, and user defined preference levels for the smart system, wherein the dynamic human-centric cost function comprises a human-centric multimodal representation of a weighted sum of an energy cost function and a user productivity function, wherein the energy cost function is a representation of an operating status of the devices, and wherein the user productivity function is a representation of a human comfort level and a human productivity level within the smart system and comprises a noise function, a cool function, a warm function, a fresh function, and a humidity function each regarding an operating status of the devices; and a transmitter coupled to the processor and configured to transmit the set of control commands to the corresponding devices within the smart system. In some embodiments, the NE further comprises a receiver coupled to the processor and configured to receive, from a plurality of external NEs configured to operate as external EIBs within the data and energy storage internet that have been established as a friend connection, external environment presence data indicating an interaction of a plurality of external users with a plurality of external devices within a plurality of external smart systems associated with each of the external NEs, wherein the processor is further configured to determine a subset of the external NEs based on an analysis of the external environment presence data indicating a likelihood of each of the external smart systems comprising sufficient surplus power or data storage to satisfy a request for energy or data storage from the associated smart system, and wherein the transmitter is further configured to transmit the request for energy or data storage to the subset of the external NEs and/or a receiver coupled to the processor and configured to receive, from an external NE configured to operate as an external EIB within the data and energy storage internet, a request for energy or data storage at a specified time; determine an eligibility of an external smart system assigned to the external NE based on a point-based credit scheme comparing a sent amount of energy or data sent to an external smart system assigned to the external NE and a received amount of energy or data received from the external smart system, wherein the point-based credit scheme comprises a weight function comprising a point value determined based on a temporal distance between the specified time and a peak time for energy or data consumption within the smart system assigned to the NE; and send a command to an electric producing device within the smart system to cause the electric producing device to provide an amount of energy or data generation satisfying the request for energy or data storage to the external smart system at the specified time upon determining that the external smart system is eligible to receive the amount of energy or data. In some embodiments, the disclosure also includes wherein the set of control commands is generated based further according to human-centric optimization objectives comprising a reduction of energy cost within the smart system and optimization of a productivity of the user within the smart system and/or wherein the human activity data comprises a time of day and a number of hours a user has interacted with each of the devices in the smart system, and/or wherein the dynamic human-centric cost function is updated by weighting the cost function according to user preferences received from a user interface coupled to the NE and within the smart system and/or wherein the friend connection for one of the external NEs is established based on the NE receiving a request, via the receiver, from the one of the external NEs to established the friend connection and the NE sending a confirmation, via the transmitter, that the friend connection has been established, and/or wherein the transmitter is further configured to transmit the human presence data to the external NE when the external NE is established as a friend connection.

In yet another embodiment, the disclosure includes a method implemented in a network element (NE) configured to operate as an Ensemble Information Broker (EIB) within a distributed data and energy storage internet architecture, the method comprising collecting energy data indicating a flow of energy during a specified period of time through a plurality of devices within a smart system associated with the NE, an amount of energy consumed by the devices during the specified period of time, and an amount of energy generated by the devices during the specified period of time; collecting human presence data in the smart system regarding a presence of a user within the smart system during the specified time; collecting human activity data in the smart system regarding user inputs to the devices and user interaction with the devices during the specified period of time; predicting future energy consumption requirements and energy generation for the smart system by employing prediction algorithms and analyzing the collected energy data, human presence data, and the human activity data; generating a set of control commands for the devices within the smart system based on the predicted future energy consumption requirements and energy generation as applied to a dynamic human-centric cost function associated with the smart system; transmitting the set of control commands to the corresponding devices within the smart system; transmitting a broadcast message to determine an external NE configured to operate as an external EIB within the data and energy storage internet and within an assigned environment or network to establish as a friend connection based on a user preference; transmitting a request to establish a friend connection with the determined NE, wherein the friend connection is established upon a receipt of a confirmation from the external NE; and transmitting the human presence data to the external NE when the friend connection is established. In some embodiments, the method further comprises receiving external NE external human presence data indicating an interaction of a plurality of external users with a plurality of external devices within an external smart system associated with the external NE when the friend connection is established and/or determining to include the external NE within a set of external NEs based on an analysis of the external human presence data indicating a likelihood of the external smart system comprising sufficient surplus power or data storage to satisfy a request for energy or data storage from the associated smart system, and transmitting the request for energy or data storage to the external NE when the external NE is included in the set of external NEs and/or receiving, from an external NE configured to operate as an external EIB within the data and energy storage internet, a request for energy or data storage at a specified time; determining an eligibility of an external smart system assigned to the external NE based on a point-based credit scheme comparing a sent amount of energy or data sent to an external smart system assigned to the external NE and a received amount of energy or data received from the external smart system, wherein the point-based credit scheme comprises a weight function comprising a point value determined based on a temporal distance between the specified time and a peak time for energy or data consumption within the smart system assigned to the NE; and sending a command to an electric producing device within the smart system to cause the electric producing device to provide an amount of energy or data generation satisfying the request for energy or data storage to the external smart system at the specified time upon determining that the external smart system is eligible to receive the amount of energy or data.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
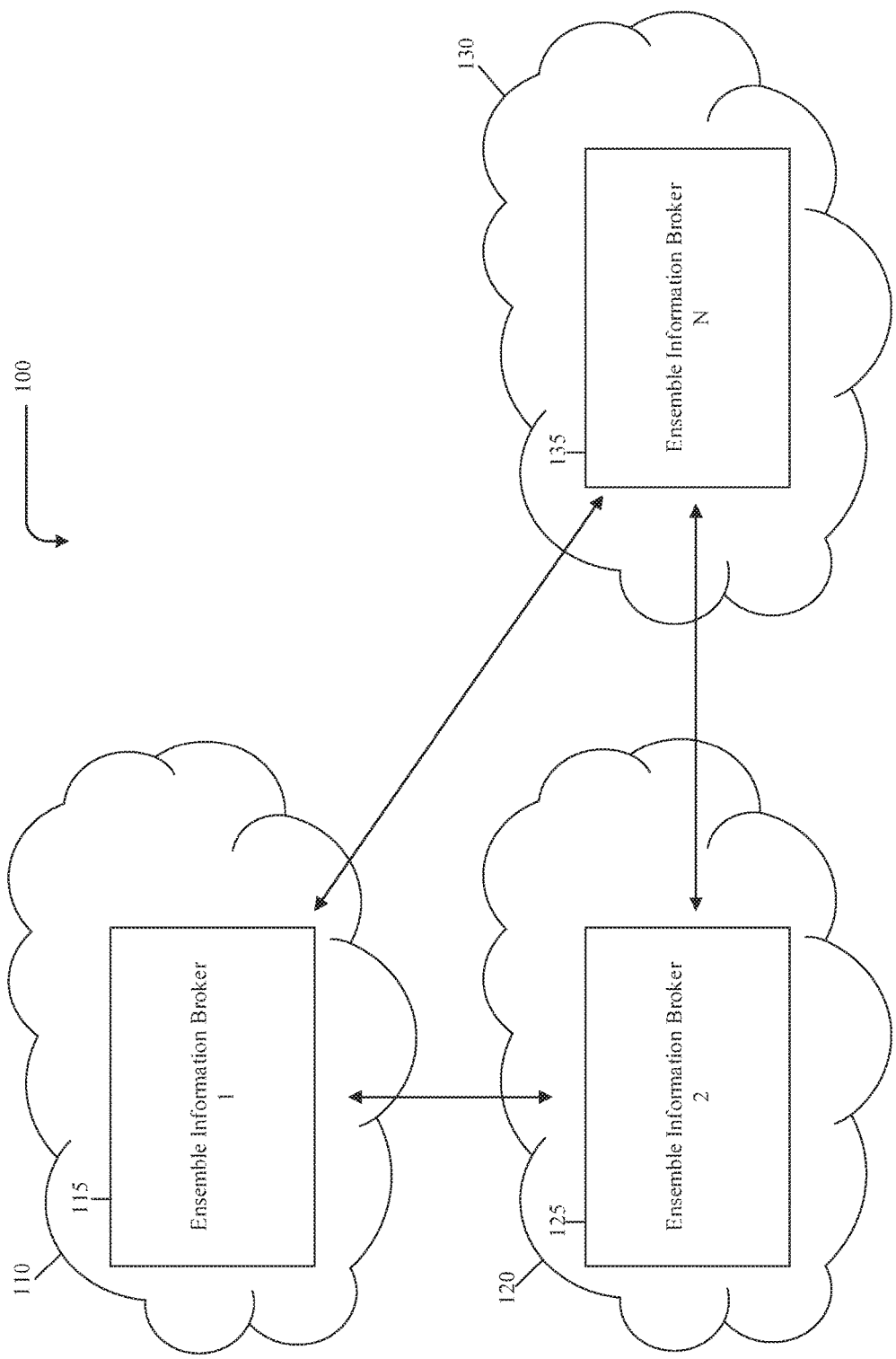
FIG. 1 is a schematic diagram of a smart system deployed within a data and energy storage internet architecture.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

One class of feedback control includes intelligent controllers. An intelligent controller may be tasked with controlling systems under various constraints in order to meet control goals. For example, an intelligent controller may control various environmental parameters for a particular environmental system. An intelligent controller may resolve and manage potentially conflicting goals. As such, designers of intelligent controllers may seek control methods and systems that effectively control systems when two or more control goals conflict.

An intelligent controller may only focus on how to reduce energy cost in lieu of how to improve productivity because improving productivity may be more resource intensive than reducing energy cost. However, together with the idea of economy sharing, opportunities exist that may reduce energy cost while at the same time improve productivity and efficiency. For example, control decisions for multiple devices may be correlated thus individual control of each device may lead to sub-optimal results. In an embodiment, an energy solution may employ Google® Nest to leverage machine-learning algorithms. However, Google® Nest provides control for only a single device (e.g. heating, ventilating, and air conditioning (HVAC)). Additionally, Google® Nest fails to leverage communication among intelligent controllers to achieve better resource sharing and coordination.

An intelligent controller may be designed to output control signals to various dynamical components of a system based on a control model and sensor feedback from the system. Such systems may exhibit a predetermined behavior or mode of operation. The control components of such systems are therefore designed to ensure that the predetermined system behavior transpires under normal operational conditions. In certain cases, there may be various different modes of operation for a system, and the control components of the system may therefore select a current mode of operation for the system and control the system to conform to the selected mode of operation.

Disclosed herein is a data and energy storage internet architecture comprising distributed Ensemble Information Brokers (EIBs) (e.g., intelligent controllers) that are configured to monitor and control devices within an associated smart system or smart network as well as communicate among one another. The data and energy storage internet provides a mechanism to achieve the dual objectives of energy cost efficiency and increased productivity for users interacting with devices controlled within the data and energy storage internet while meeting service level agreements (SLAs) and Quality of Service (QoS) requirements established for the data and energy storage internet. In an embodiment. EIBs within a data and energy storage internet architecture communicate with one another in a peer-to-peer manner (e.g., by employing peer-to-peer communication protocols). The peer-to-peer communication between EIBs allows each EIB within the data and energy storage internet to send and receive requests to trade information and energy resources through a network directly to/from the other EIBs within the data and energy storage internet.

EIBs within a data and energy storage internet architecture employ intelligent information and resource sharing schemes in order to achieve the above stated system objectives. Each EIB and the controlled consuming, producing, and storing (e.g., battery, data storage) devices form a smart system or smart network. In various embodiments, an EIB functions as a smart controller over the controlled devices within an associated smart system. In an embodiment, the EIB comprises an analytical model and predictor and a costs-aware workload controller/scheduler.

EIBs and associated smart systems may be deployed for offices, homes, large enterprises, and other applicable environments. In an embodiment, a device may be configured to function as an EIB to store energy usage, data usage, and user personalization data regarding the devices within an associated smart system, interactions with the devices, and a presence within the associated smart system. User personalization data may include human presence data, which regards time periods when users are present in the smart system. User personalization data may also include human activity data which regards time periods when a user is using or interacting with the devices in an associated smart system (e.g., a time of day and/or a number of hours a user has interacted with the devices in the smart system) or user inputs, preferences, or configurations to the devices/smart system. The EIB analyzes and controls the devices within an associated smart system by employing machine learning and model-based predictive control techniques. For example, an EIB may control power for an associated device (e.g., whether the device is on or off) and/or a charge (e.g., receiving) and/or discharge (e.g., release) of energy stored on a device (e.g., an energy producing or storage device). In various embodiments, the EIB learns habits of users that interact with the devices within the smart system and may exchange this human presence data and human activities data with other EIBs within the data and energy storage internet. The EIBs may employ the human presence data and human activities data to predict behaviors and to schedule performance and activity for the devices within an associated smart system. Additionally, the EIB may detect anomalies (e.g. energy theft) by monitoring energy and data streaming within the smart system. In various embodiments, an EIB may be configured to contribute to and/or be part of software-defined commodity hardware, which comprises a smart home or a smart city. In an embodiment, an EIB may be implemented as a virtual information broker for smart homes and/or smart offices.

EIBs within the data and energy storage internet may establish "friend" connections between one another. The EIB may trade resources with one another based on a rules set and/or a point-based credit scheme and the established or unestablished friend connections. In an embodiment, the rules set and point-based credit scheme enforce policies which require each EIB to contribute to the energy trading within the data and energy storage internet before placing a discharging request. In an embodiment, the point-based credit scheme employed by an EIB assigns weighted values to external EIBs within the data and energy storage internet that have sent energy to and taken energy from a smart system associated to the EIB. The weighted values factor in the time of day that the energy was taken or received along with an amount of energy taken or received. The point-based credit scheme determines whether an external EIB is qualified to received energy for the smart system associated to an EIB at a determined request time based on the weighted values and the amount of energy requested. In an embodiment, the point-based credit scheme compares a sent amount of energy or data sent to an external smart system and a received amount of energy or data received from the external smart system and comprises a weight function comprising a weight value determined based on a temporal distance between the specified time and a peak time for energy or data consumption within an associated smart system assigned to the EIB.

FIG. 1 is a schematic diagram of an embodiment of a data and energy storage internet architecture 100 comprising smart systems 110, 120, and 130. Smart systems 110, 120, and 130 each comprise respectively a distributed EIB 115, 125, and 135 and a plurality of display devices, electronic devices, energy generation devices, energy storage devices, smart devices, and Wi-Fi adapters (not shown). Smart systems 110, 120, and 130 are substantially similar to one another. EIBs 115, 125, and 135 are substantially similar to one another. EIBs 115, 125, and 135 communicate in a peer-to-peer manner. FIG. 1 depicts how EIBs 115, 125 and 135 within the data and energy storage internet architecture 100 communicate with one another in a distributed environment. While three smart systems are shown in FIG. 1, it is understood that a data and energy storage internet architecture may comprise any number of smart systems.

In the disclosed embodiment, EIBs 115, 125, and 135 each maintain control over and collect data from the devices within the corresponding associated smart system 110, 120, and 130 respectively. EIBs 110, 120, and 130 communicate with other EIBs (external) within the data and energy storage internet architecture 100 to obtain/send energy. For example, EIBs 115, 125, and 135 may send or request energy for the devices within an associated smart system but not for devices outside of the associated smart system. In various embodiments, the EIBs 115, 125, and 135 may not share control information for or a consumption pattern of the devices within an associated smart system with other external EIBs.

In various embodiments, EIBs 115, 125, and 135 may establish friend connections between one another. In an embodiment, a friend connection represents a mutually agreed upon status between EIBs, such as EIBs 115, 125, and/or 135 within the energy storage internet architecture, such as energy storage internet architecture 100. EIBs 115, 125, and 135 may each employ a different rules set(s) and/or point-based credit scheme to govern the exchange of energy between an EIB that is established as a friend connection. In various embodiments, an EIB does not gain control over devices in another smart system associated with another EIB should the other EIB grant a friend connection. Any EIB can communicate with any other EIB within the data and energy storage internet architecture 100 in a peer-to-peer manner through network connection(s) and/or via a cloud. In various embodiments, EIBs 115, 125, and 135 are assigned a unique identifier.

An EIB, such as EIBs 115, 125, and 135, may request to become a friend connection with any other EIB with the data and energy storage internet architecture 100. A friend connection is established once an EIB, such as EIBs 115, 125, and 135, sends a request to establish a friend connection and receives a request confirmation from the requested EIB. In an embodiment, two EIBs that have established a friend connection may exchange general information and send messages with each other as well as employ a different set of rules set and/or a point-based credit scheme to govern the exchange of energy between the two EIBs. Additionally, EIBs, such as EIBs 115, 125, and 135, with an established friend connection may share energy pattern data with each other. In various embodiments, EIBs, such as EIBs 115, 125, and 135, may not share energy pattern data with other EIBs that are not established as friend connections. In various embodiments, the energy pattern data is the usage pattern of energy consumption in the smart system or environment (e.g. home or office) serviced by the devices within the smart system as a result of energy and/or data usage. An EIB, such as EIBs 115, 125, and 135, may store energy pattern data received from EIB that have been established a friend connection locally and may analyze the shared energy pattern data to determine whether an EIB may be a possible candidate to fulfil a charge/discharge request. In various embodiments, an EIB that has not established a friend connection to a second EIB may still trade energy with the second EIB through energy storage internet architecture 100 based on a point-based credit scheme.

In various embodiments, the peer-to-peer communication between the EIBs 115, 125, and 135 is a decentralized communications model in which each party/node (e.g., each EIB) has the same capabilities and either party can initiate a communication session. Unlike a client/server model, in which the client makes a service request and the server fulfills the request, the peer-to-peer model allows each node to function as both a client and server. In various embodiments, EIBs 115, 125, and 135 may exchange resource information and request and send energy to one another. In a disclosed embodiment, EIBs 115, 125, and 135 send and receive requests to trade information and energy resources to/from one another and may establish friend connections between one another. In an embodiment, a friend connection represents a mutually agreed upon status between an EIB, such as EIBs 115, 125, and 135, and another EIB within an energy storage internet architecture, such as energy storage internet architecture 100.

EIBs 115, 125, and 135 may trade resources (e.g., energy) with one another based on a rules set and/or a point-based credit scheme. In various embodiments. EIBs 115, 125, and 135 may request energy from another EIB, such as EIBs 115, 125, and when the other EIB has made a sufficient amount of contributions to the network and obtained enough points to trade the requested resources. In an embodiment, the sufficient amount of contributions to the network and/or a number of enough points to trade the requested resources is determined by a setting(s) global to the energy storage internet architecture 100. In another embodiment, the sufficient amount of contributions to the network and/or a number of enough points to trade the requested resources is determined by a setting(s) local to each EIB, such as EIBs 115, 125, and 135, within the energy storage internet architecture 100. In an embodiment, a rule set and/or point-based system employed by an EIB, such as EIBs 115, 125, and 135, to trade resources with other EIBs is determined based on whether an EIB has been established as a friend connection. To state another way, one rule set and/or point-based system may be employed by an EIB, such as EIB 115, 125, and 135, for an EIB that has been established as a friend connection and another rule set and/or point-based system may be employed by the EIB for a second EIB that has not been established as a friend connection.

In an embodiment, the rules set(s) and/or point-based credit scheme enforce policies which require each EIB, such as EIBs 115, 125, and 135, to contribute to the energy trading within energy storage internet architecture 100 before placing a charge (e.g., request for energy) and/or a discharge (e.g., announce that a surplus of energy that is available for transfer) request. In an embodiment, the point-based credit system employed by an EIB, such as EIBs 115, 125, and 135, assigns weighted values to each EIB, such as EIB 115, 125, and 135, within energy storage internet architecture 200 that have sent energy to, and taken energy from, an associated smart system, such as smart systems 110, 120, and 130. The weighted values factor in the time of day that the energy was taken or received along with an amount of energy taken or received. In an embodiment, the point-based credit system employed by EIBs 115, 125, and 135 determine whether an EIB associated with another smart system, such as smart systems 110, 120, and 130, is qualified to receive energy from devices within an associated smart system, such as smart systems 110, 120, and 130, at a determined request time based on the weighted values and the amount of energy requested. In an embodiment, the point-based credit scheme compares a sent amount of energy or data sent to an external smart system and a received amount of energy or data received from the external smart system and comprises a weight function comprising a weight value determined based on a temporal distance between the specified time and a peak time for energy or data consumption within the smart system assigned to the EIB, such as EIB 115, 125, and 135.

Figure 2:
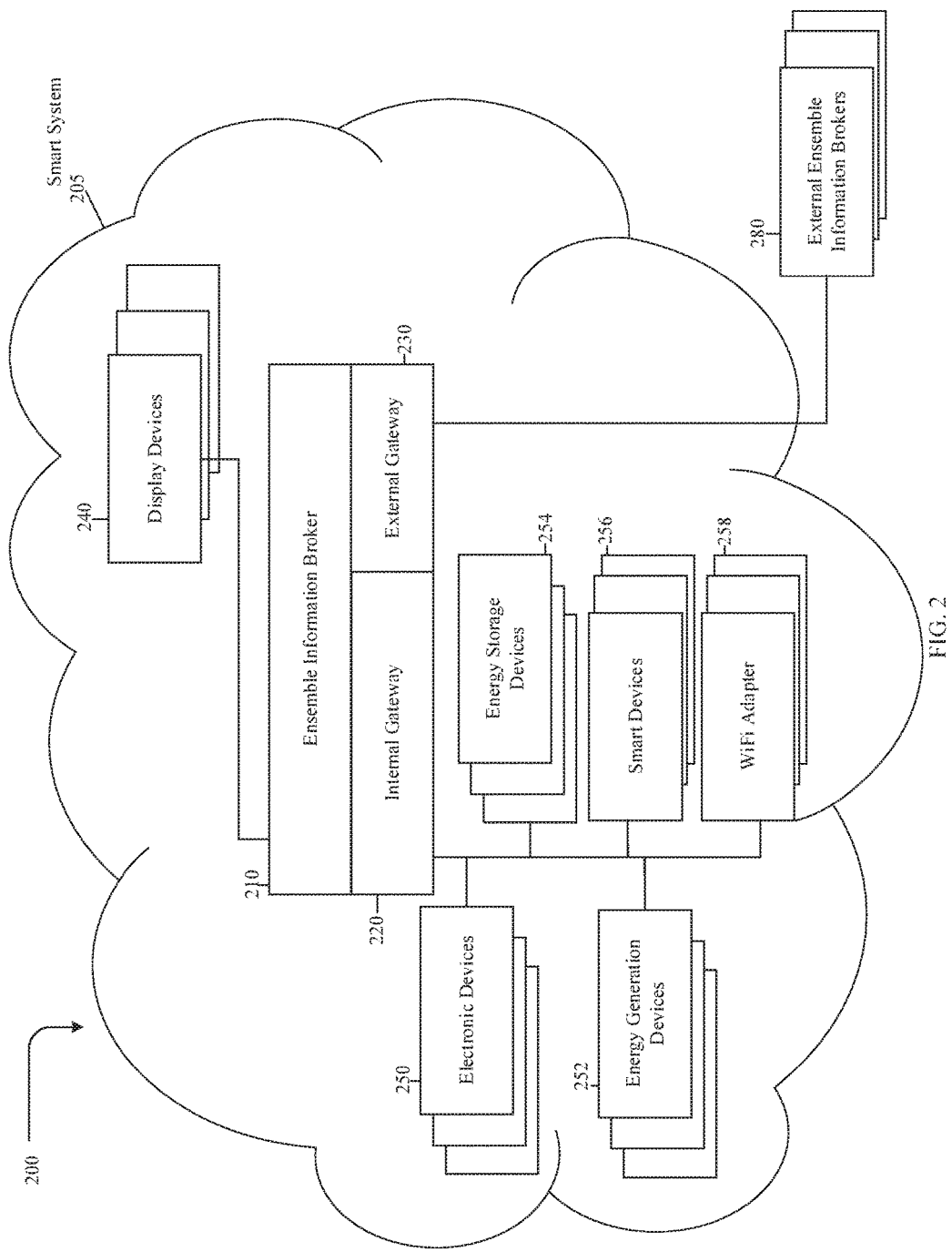
FIG. 2 is a schematic diagram of an embodiment of an NE configured to implement an EIB within a network.

FIG. 2 is a schematic diagram of a data and energy storage internet architecture 200 comprising a smart system 205 and external EIBs 280. Smart system 205 comprises an EIB 210, multiple display devices 240, electronic devices 250, energy generation devices 252, energy storage devices 254, smart devices 256 (e.g., smart phones/tablets), and Wi-Fi adapters 258. Energy storage internet architecture 200 is substantially similar to energy storage internet architecture 100. Smart system 205 is substantially similar to smart systems 110, 120, 130. EIB 210 and external EIBs 280 are sustainably similar to EIBs 115, 125, and 135. In a disclosed embodiment. EIB 210 is associated with smart system 205 and the multiple electronic devices 250, energy generation devices 252, energy storage devices 254, smart devices 256 (e.g., smart phones/tablets), and Wi-Fi adapters 258 to provide control over the associated devices and adapters 250, 252, 254, 256, 258 and to monitor behaviors of the devices and adapters 250, 252, 254, 256, 258 as well as user interactions with the devices and adapters 250, 252, 254, 256, 258. For example, EIB 210 collects information regarding energy consumption and generation for the devices and adapters 250, 252, 254, 256, 258. In another example, EIB 210 collects information regarding a flow of energy. EIB 210 may collect this information, energy consumption and generation and/or the flow of energy, continuously or for a specified period of time. In a disclosed embodiment. EIB 210 provides control over the associated devices and adapters 250, 252, 254, 256, 258 in order to provide energy cost efficiency and increased productivity for users interacting with devices and adapters 250, 252, 254, 256, 258 while meeting SLAs and QoS requirements established for energy storage internet architecture 200 and/or smart system 205. In a disclosed embodiment. EIB 210 communicates to the associated devices and adapters 250, 252, 254, 256, 258 though an internal network gateway 220. In an embodiment, EIB 210 is implemented on a hardware computing device. In other embodiments, EIB 210 may be implemented as a virtual layer (e.g., virtual machine) on an NE configured within a network or though commodity software integrated on an NE.

In various embodiments, internal network gateway 220 is a gateway through which the devices within smart system 205 associated with EIB 210 communicates to EIB 210. In one embodiment, internal network gateway 220 connects devices within a single network. In one embodiment, the internal network gateway 220 connects devices within multiple networks. In various embodiments, external network gateway 230 is a gateway through which devices external to smart system 205, such as external EIBs 280, connect to EIB 210.

In various embodiments, electronic devices 250 are any device that consumes energy (e.g., a personal computer, laptop). In a disclosed embodiment, the electronic devices 250 may be configured with real-time control requirements or may be configured without real-time control requirements. In various embodiments, energy generation devices 252 are any device that has the potential to generate energy (e.g., a generator). Energy generation devices 252 may be configured with constant data streaming requirements. In various embodiments, energy storage devices 254 are any device that has the potential to store energy (e.g., a battery). Energy storage devices 254 may be configured with real-time control requirements. In various embodiments, smart devices 256 are connected to other devices or networks via different wireless protocols that can operate to some extent interactively and autonomously (e.g., smart phones/tablets). In various embodiments. Wi-Fi adapters 258 are devices that add wireless connectivity to another device. In various embodiments, the devices and adapters 250, 252, 254, 256, 258 are coupled to an internal network. In other embodiments, the devices and adapters 250, 252, 254, 256, 258 are coupled to multiple internal networks.

In various embodiments, EIB 210 is any device that collects data regarding energy consumption (e.g., energy data consumption) and/or data consumption (e.g., internet data consumption) from a plurality of devices and adapters such as devices and adapters 250, 252, 254, 256, 258, and employs the collected data to provide a set of control commands to the devices. EIB 210 receives and stores the energy usage and user personalization data for the devices and adapters 250, 252, 254, 256, 258 within the associated smart system 205. EIB 210 analyzes the collected data and provides control for the devices and adapters 250, 252, 254, 256, 258 by employing machine learning and model-based predictive control techniques to the collected data. For example, EIB 210 may control power for electronic devices 250 (e.g., whether a device is on or off) and/or a charge or discharge of energy stored on energy storage devices 254. In an embodiment. EIB 210 is configured to optimize energy costs of the controlled devices and adapters 250, 252, 254, 256, 258.

In various embodiments, user personalization data includes settings for the controlled devices and adapters 250, 252, 254, 256, 258 within the smart system 205 that a user(s) may define. User personalization data may also include human presence data, which regard a record of a user presence within the smart system, and human activity data, which regards time periods and length of engagements when a user(s) interacts with the devices within the smart system 205, such as devices and adapters 250, 252, 254, 256, 258.

In various embodiments, EIB 210 is configured to improve productivity for users interacting with the controlled devices and adapters 250, 252, 254, 256, 258. EIB 210 may learn habits of users that interact with the devices and adapters 250, 252, 254, 256, 258 within the associated smart system 205 and may exchange this human presence data and human activity data with other external EIBs 280 within energy storage internet architecture 200. EIB 210 may employ the human presence data and human activity data gathered locally (i.e., with the assigned smart system 205 and/or received from external EIBs 280) to predict behaviors and to schedule performance and activity for the devices and adapters 250, 252, 254, 256, 258 within the associated smart system 205. Additionally, EIB 210 may detect anomalies (e.g., energy theft) by monitoring energy and data streaming within the smart system 205.

In a disclosed embodiment. EIB 210 communicates in a peer-to-peer manner to other external EIBs 280 within energy storage internet architecture 200 through an external network gateway 230. In various embodiments. EIB 210 is configured within an internal network and the external EIBs 280 are configured on an external network(s). The external EIBs 280 are substantially similar to EIB 210 and EIBs 115, 125, and 135.

In various embodiments, EIB 210 may be coupled to multiple display devices 240. The display devices 240 may be associated with sub-networks comprising devices within the smart system 205 controlled by EIB 210. In an embodiment, display devices 240 may be an application view on a mobile device or various other display type devices. In various embodiments, the display devices 240 provide a user interface that may access and monitor the various devices and adapters 250, 252, 254, 256, 258, associated with, and controlled by EIB 210. In an embodiment, one of the display devices 240 may be configured to show reading information from EIB 210 and another of the display devices 240 may be configured to show reading information from each sub-network with the smart system 205. In various embodiments, reading information includes status of managed devices, scheduled tasks, and request status and history received from external EIBs 280. Sub-networks may comprise a subset of the devices and adapters, such as devices and adapters 250, 252, 254, 256, 258, within smart system 205.

Figure 3:
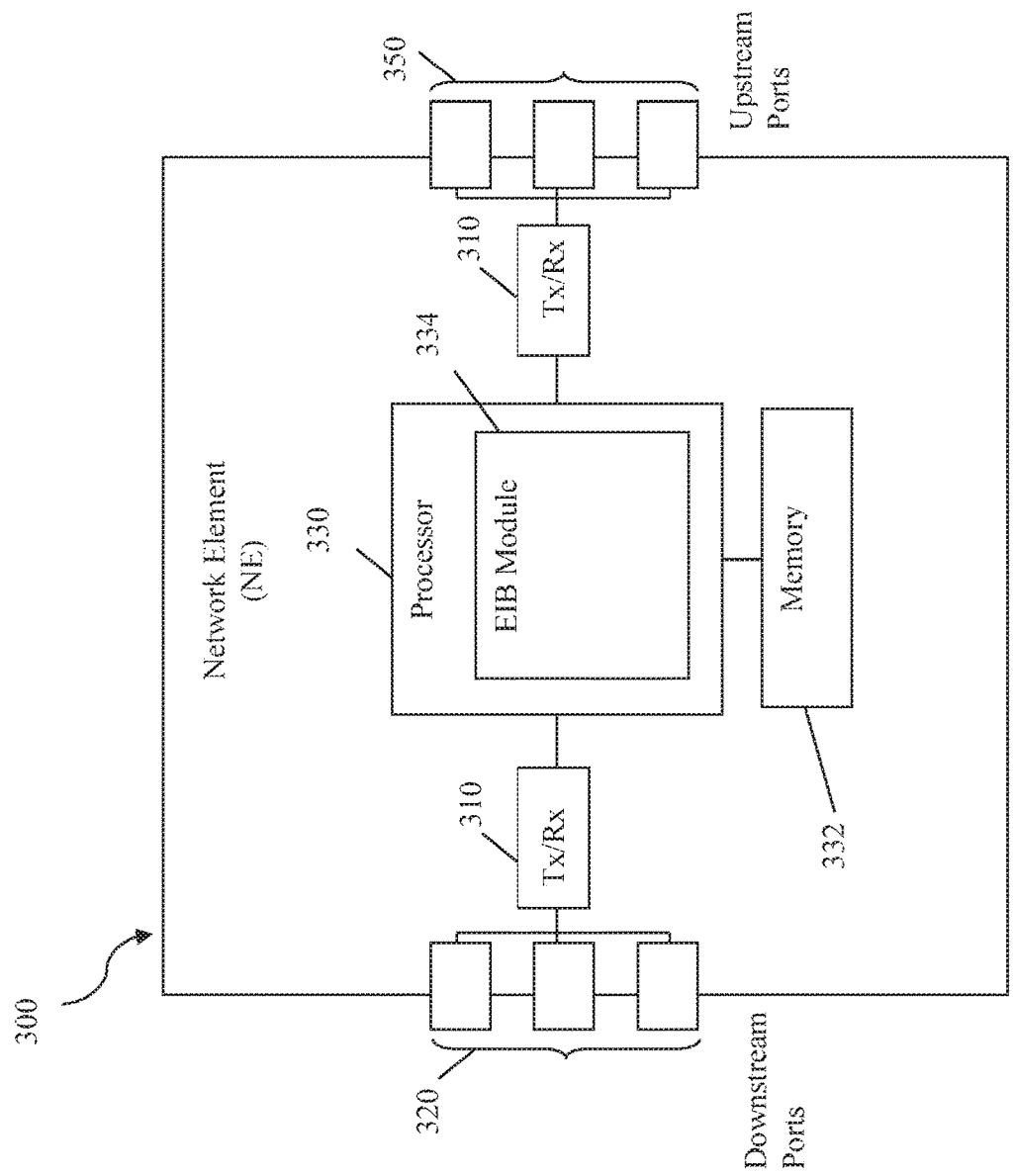
FIG. 3 is a schematic diagram of an embodiment of a data and energy storage internet architecture comprising a plurality of smart systems.

FIG. 3 is a schematic diagram of an embodiment of an NE 300 configured to implement an EIB, such as EIBs 115, 125, 135, 210, and 280, within a network comprising a smart system, such as smart systems 110, 120, 130, and 205. NE 300 may be implemented in a single node or the functionality of NE 300 may be implemented in a plurality of nodes. One skilled in the art will recognize that the term NE encompasses a broad range of devices of which NE 300 is merely an example, NE 300 is included for purposes of clarity of discussion, but is in no way meant to limit the application of the present disclosure to a particular NE embodiment or class of NE embodiments. At least some of the features/methods described in the disclosure are implemented in a network apparatus or component such as an NE 300. For instance, the features/methods in the disclosure may be implemented using hardware, firmware, and/or software installed to run on hardware. The NE 300 is any device that transports packets through a network (e.g., a switch, router, bridge, server, a client, etc).

As shown in FIG. 3, the NE 300 may comprise transceivers (Tx/Rx) 310, which are transmitters, receivers, or combinations thereof. A Tx/Rx 310 is coupled to a plurality of downstream ports 320 (e.g., downstream interfaces) for transmitting and/or receiving packets from other nodes and a Tx/Rx 310 coupled to a plurality of upstream ports 350 (e.g., upstream interfaces) for transmitting and/or receiving packets from other nodes, respectively. A processor 330 is coupled to the Tx/Rxs 310 to process the packets and/or determine which nodes to send packets to. The processor 330 may comprise one or more multi-core processors and/or memory 332 devices, which function as data stores, buffers. Random Access Memory (RAM), Read Only Memory (ROM), etc. Processor 330 may be implemented as a general processor or may be part of one or more application specific integrated circuits (ASICs) and/or digital signal processors (DSPs). Processor 330 comprises an EIB Module 334, which implements at least some of the methods discussed herein such as methods 500 and 600 described below. In an alternative embodiment. EIB Module 334 is implemented as instructions stored in memory 332, which are executed by processor 330, or implemented in part in the processor 330 and in part in the memory 332, for example a computer program product stored in a non-transitory memory that comprises instructions that are implemented by the processor 330. In another alternative embodiment, the EIB Module 334 is implemented on separate NEs. The downstream ports 320 and/or upstream ports 350 may contain electrical and/or optical transmitting and/or receiving components.

It is understood that by programming and/or loading executable instructions onto the NE 300, at least one of the processor 330. EIB Module 334, Tx/Rxs 310, memory 332, downstream ports 320, and/or upstream ports 350 are changed, transforming the NE 300 in part into a particular machine or apparatus. e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design is developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
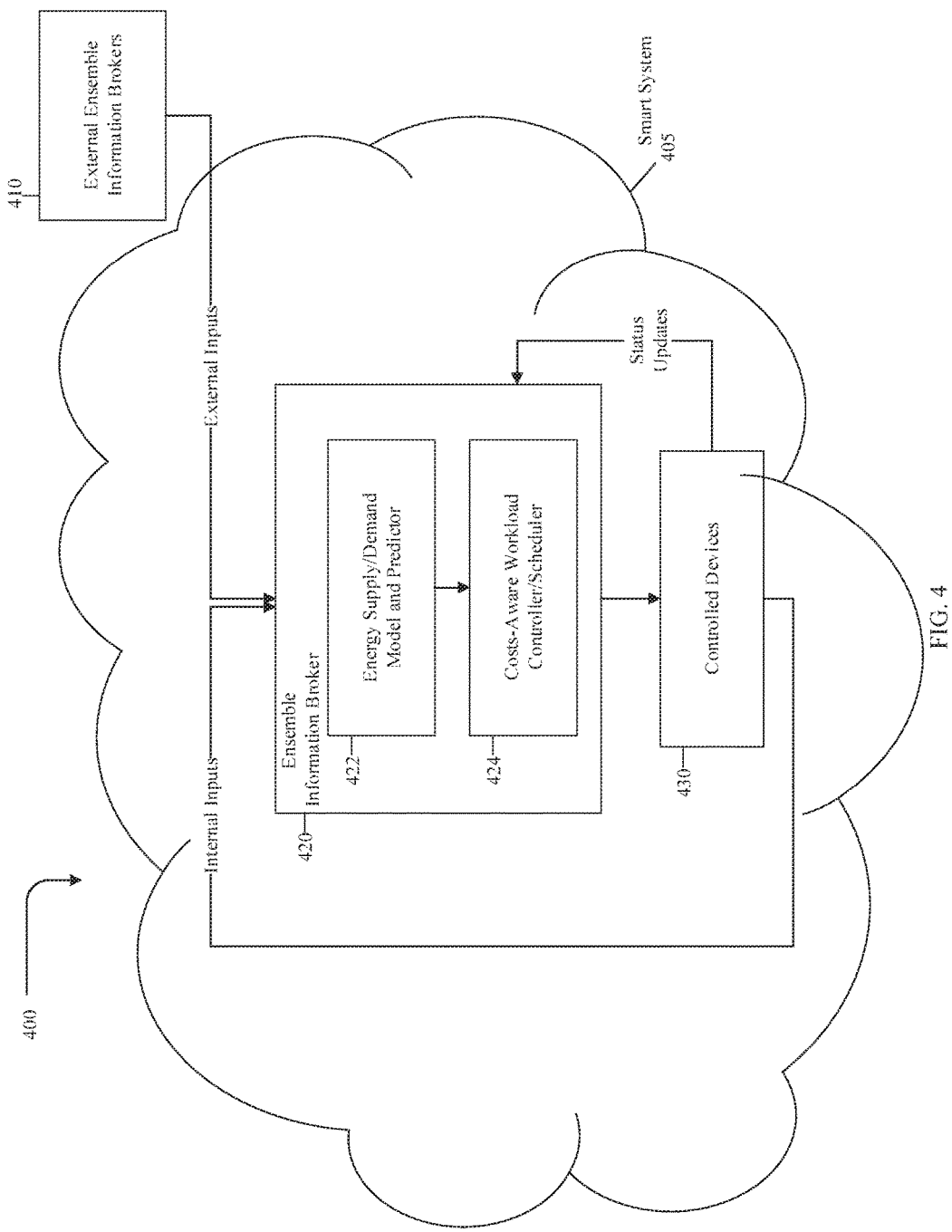
FIG. 4 is a schematic diagram of an embodiment implemented on an EIB configured within a network.

FIG. 4 is a schematic diagram of an embodiment a data and energy storage internet architecture 400 comprising a smart system 405 and external EIBs 410. Smart system 405 comprises EIB 420 and controlled devices 430. EIB 420 comprises a P Component 422 and a C Component 424. Data and energy storage internet architecture 400 is substantially similar to data and energy storage internet architecture 100 and 200. Smart system 405 is substantially similar to smart systems 110, 120, 130, and 205. External EIBs 410 and EIB 420 are substantially similar to EIBs 115, 125, 135, 210, and 280 and NE 300. Controlled devices 430 are substantially similar to devices and adapters 250, 252, 254, 256, and 258.

In an embodiment. P Component 422 reads internal data inputs from the controlled devices 430 and external data inputs from external EIBs 410, updates internal system models, and sends the updated model data to C Component 424. The internal and external inputs may comprise energy usage and user personalization data obtained from the various sources, such as controlled devices 430 and external EIBs 410. C Component 424 receives the updated model data and determines control function (i.e., control commands) for the controlled devices 430 within the associated smart system 405 according to optimization objectives through a dynamic human-centric cost function. An optimization objective is a pre-determined desired result to be achieved by a smart system such as reduction of cost and/or optimization of productivity.

In various embodiments, EIB 420 may define and divide a determined period of time (e.g., twenty-four hours) into a number of time slots in order to schedule command functions for the controlled devices 430. In an embodiment, C Component 424 may send the determined control functions to the controlled devices 430 via an internal network gateway, such as internal network gateway 220 or may schedule a command function update for a device for a particular time slot. P Component 422 and C Component 424 are described in greater detail in other figures below.

In various embodiments, P Component 422 and C Component 424 may be implemented in a network apparatus or module such as, for example, NE 300, a personal computer (PC), and/or a mobile device (e.g., smart phone, tablet computer, etc.). The features and/or methods implemented by EIB 420 may be realized using hardware, firmware, and/or software installed on the network apparatus or module.

In one embodiment, dynamic human-centric cost function is represents as:

$$Cost\_function = c1*Cost\_Function(Device\_Status) + c2*Productivity\_Function(Device\_Status).$$

Where the production function may be represented as:

$$Productivity\_Function = Function\{w1*s1*Noise\_Function(Device\_Status) + w2*s2*Cool\_Function(Device\_Status) + w3*s3*Warm\_Function(Device\_Status) + w4*s4*Fresh\_Function(Device\_Status) + w5*s5*Humidity\_Function(Device\_Status)\}.$$

where w1 through w5 are based on user inputs and are set to default values if no inputs are provided; where s1 through s5 are based on human behavior analytics which are dynamically updated according to human behaviors, and where Noise_Function, Cool_Function, Warm_Function. Fresh_Function, and Humidity_Function are functions trained through the employment of existing regression methods. In an embodiment, the input of each function, such as Noise_Function, Cool_Function. Warm_Function. Fresh_Function, and/or Humidity_Function, is a device status and the output of each function is a comfort level of humans interacting with the devices a smart system associated with an EIB employing the Cost Function. The comfort level may be measures in terms of several dimensions including noise, cool, warm, air freshness, and humidity. In an embodiment, W is user input weights and S are analytics based weights. In an embodiment, the cost function may be recursive, as shown, depending on a real-time energy price as well as a status of the devices within a smart system associated with an EIB employing the Cost Function.

In various embodiments, the dynamic human-centric cost function comprises a human-centric multimodal representation of a weighted sum of an energy cost function and a user productivity function. In an embodiment, a human-centric multimodal representation is a representation of measurable human-centric effects (e.g., human comfort and/or user productivity) and of measurable causal effects (e.g., noise, cool, warm, fresh, humidity, brightness, color preferences). In an embodiment, the causal effects may have such effects on the human-centric effects in such multimodal representation. In an embodiment, the energy cost function is a representation of an operating status of devices, such as controlled devices 420, within an associate smart system, such as smart systems 110, 120, 130, 205, and 405. In an embodiment, the user productivity function is a representation of a human comfort level and a human productivity level measure and determined by users who are present within an associated smart system, such as smart system 110, 120, 130, 205, and 405 and/or that interact with the devices, such as controlled devices 420, within the associated smart system. The user productivity function may comprise a noise function, a cool function, a warm function, a fresh function, and a humidity function. These functions (noise; cool, warm, fresh, and humidity) provide control and monitor an operating status of the devices with regard to a corresponding output of the devices (e.g., noise; cool, warm, fresh, and humidity). In an embodiment, the dynamic human-centric cost function integrates types of representation and functions together with a corresponding causal relationship to connect both the energy cost function and the human-centric multimodal representation/function. Thus, providing a mechanism to improve human productivity at a lower energy usage/cost.

Various data inputs are received by EIB 420 from internal sources (i.e., sources within smart system 405), such as controlled devices 430, and external sources (i.e., sources not within smart system 405), such as external EIBs 410. Examples of data inputs include data sources and system requirements comprising renewable energy supply, energy storage status, data streaming SLAs, energy consumption data, renewable energy, weather information, and owner's QoS requirements. Data inputs may also include commands from user interface displayed on, for example, a display, such as displays 240, or a smart device, such as smart devices 256. Data inputs may also include measured human activity for the controlled devices within an associated smart system and/or calendar data associated with the controlled devices. Data inputs may include data received from internet data consumption devices and energy consumption devices. Data inputs may also include updated prices information.

The data inputs received from the controlled devices 430 and the external EIBs 410 feed into P Component 422 as data points. P Component 422 processes and models the various supplied data points and feeds the results into C Component 424. C Component 424 determines control functions for the controlled devices within an associated smart system based on the modeled data and feeds the decisions (e.g., control parameters) into the various controlled devices 430, such as electric devices 250, energy generation devices 252, and energy storage devices 254, controlled by EIB 420. For example, EIB 420 may receive a command internal inputs (e.g. from a user interface) and may forward a received command to P Component 422 which may then forward the results of the command and model date to C Component 424. In other embodiments. EIB 420 may forward the command directly to C Component 424. C Component 424 processes the received data (e.g., the command or the model results) and may then send a control signal to a corresponding device to alter or change a behavior on the devices or to direct energy from away from or to the particular device. In various embodiments, the controlled devices feed status updates to C Component 424. C Component 424 may use the status updates to employ this data when determining the various command functions to send to the controlled devices 430.

In one example, EIB 420 may receive a command from the user interface for an electronic device M with no real-time control requirements, such as electronic devices 250, to activate a control decision variable associated with the electronic device M. For example, a specific control may be powering on or powering off the device, sending stored or generated energy to a destination, or scheduling increased power consumption on the device for an amount of time. The command is forwarded by EIB 420 to the C Component 424 where a control decision variable associated with the electronic device M is activated. C Component 424 then sends a corresponding control command to the electronic device M corresponding to the activated control decision variable. In various embodiments, a control decision various for a device, such as those include in controlled devices 430, is mapped to a specific control on the device. Control decision variable may be established for each controlled device 430 within smart system 405. Thus, EIB 420 may control the various mapped functions on the controlled devices though the manipulation of the mapped control decision variables.

In another example, EIB 420 may receive a command from the user interface for an electronic device N with real-time control requirements, such as electronic devices 250, to update a model associated with the electronic device N and to activate a control decision variable associated with the electronic device N. The command is forwarded by EIB 420 to P Component 422 where the model associated with the electronic device N is updated and the results forwarded to C Component 424. C Component 424 then activates a control decision variable associated with the electronic device N. C Component 424 then sends a corresponding control command to the electronic device N corresponding to the activated control decision variable. The command from the proceeding example may also be employed for an Energy Generation device, such as Energy Generation Devices 252, or an Energy Storage device, such as Energy Storage Devices 254.

In yet another example, EIB 420 may receive a command from the user interface to update a monitored Human Activity. The command is forwarded by EIB 420 to C Component 424 where the cost function and constraint(s) associated with the monitored human activity is updated. C Component 424 may then send a control command to any devices affected by the updated cost function and/or constraint(s).

Figure 5:
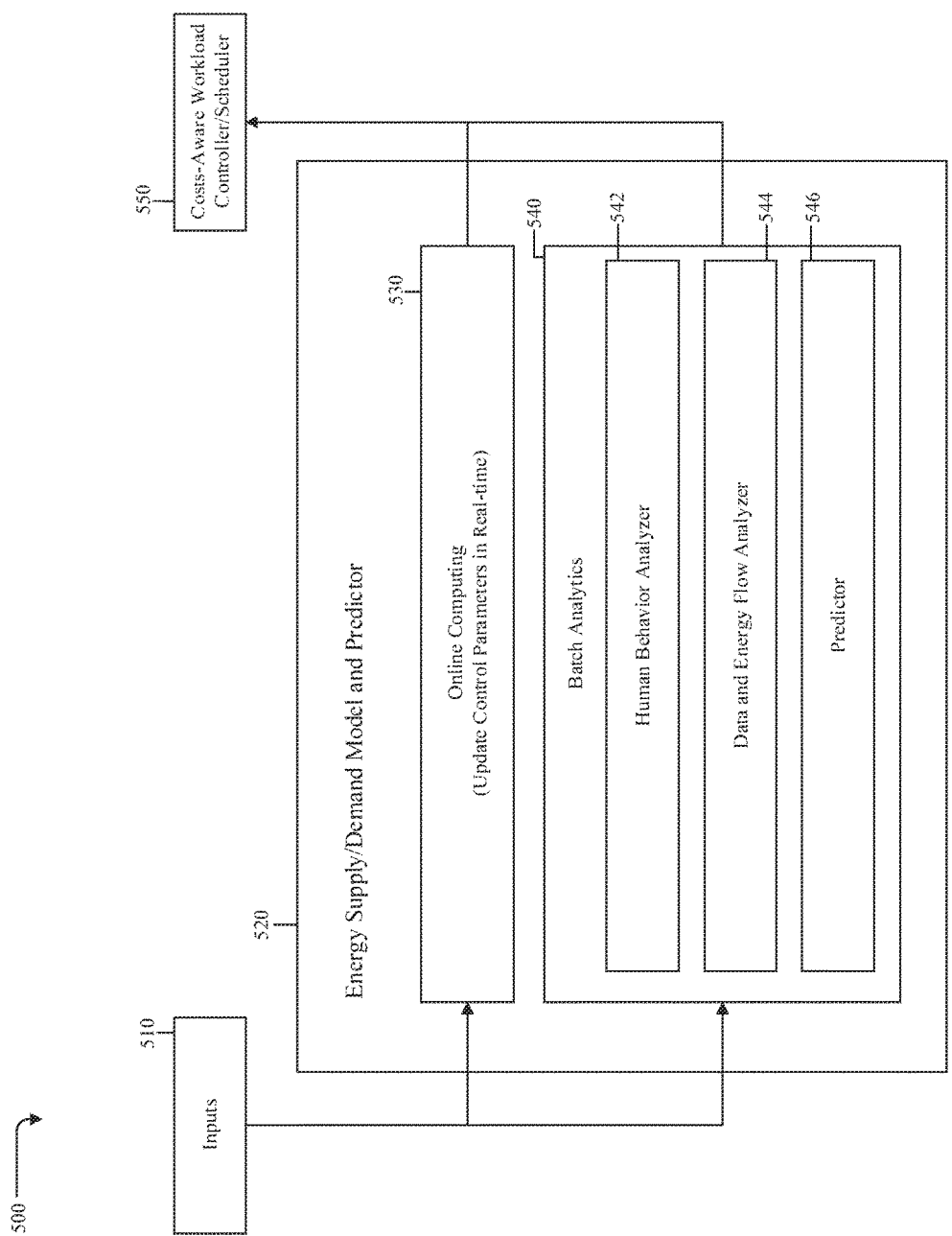
FIG. 5 a schematic diagram of an embodiment of an Energy Supply/Demand Model Predictor (P) component implemented on an EIB.

FIG. 5 a schematic diagram of an embodiment 500 of a P component 520 implemented on an EIB, such as EIBs 115, 125, 135, 210, 280, and 420 and NE 300. P Component 520 continuously checks for a command or data from data from inputs 510. Inputs 510 may be received from internal sources, such as controlled devices 430, and/or from external sources, such as external EIBs 280 and 410. P Component 520 is substantially similar to P Component 422. P 520 comprises an Online Computing Component 530 and a Batch Analytics Component 540. The Batch Analytics Component 540 comprises a Human Behavior Analyzer Component 542, a Data and Energy Flow Analyzer Component 544, and a Predictor Component 546. In an embodiment, Online Computing Component 530 updates the control parameters in real-time associated with models for the devices, such as devices and adapters 250, 252, 254, 256, and 258, controlled by the EIB and sends the results to a C Component 550. C Component 550 is substantially similar to C Component 424.

The components comprising the Batch Analytics Component 540, Human Behavior Analyzer Component 542. Data and Energy Flow Analyzer Component 544, and Predictor Component 546, collect data received from the inputs 510 and perform calculations on various models and apply analytics to the various models for a defined period of time. The results of the calculation are sent to the C Component 550 at a determined interval.

In an embodiment, the Human Behavior Analyzer Component 542 collects data regarding human interaction with the various devices controlled by the EIB. Such interaction may include a time of day and number of hours a user interacts with a particular device(s) and/or a combination of device(s) interacted with during a particular time interval.

In an embodiment, the Data and Energy Flow Analyzer Component 544, collects data regarding the flow of energy and data through the various devices controlled by the EIB as well as the amount of energy consumed and/or generated by a device(s) for a particular period of time. In an embodiment, the Predictor Component 546 leverages existing prediction algorithms to estimate the future affairs of difference categories of information and may analyze the energy consumption and generation of various inputs. The prediction algorithms may be applied to collected and received personalization data and energy pattern data. Further, the Predictor Component 546 updates a charge model for the devices within an associated smart system. In one example, a charge model may be set to "$x\hat{}(t+1)=xt+ut-qt$" where x is an inventory level of an energy storage device (e.g. battery), t is a specific time, xt is an inventory level of an energy storage device (e.g. battery) at the time t, ut is an amount of energy charged to the energy storage device at the time t, and qi is the amount of energy discharged from the energy storage device at the time t. The predictor may update the charge model according to the inputs of SLAs, QoSs, energy storage status, and renewable energy supply.

Figure 6:
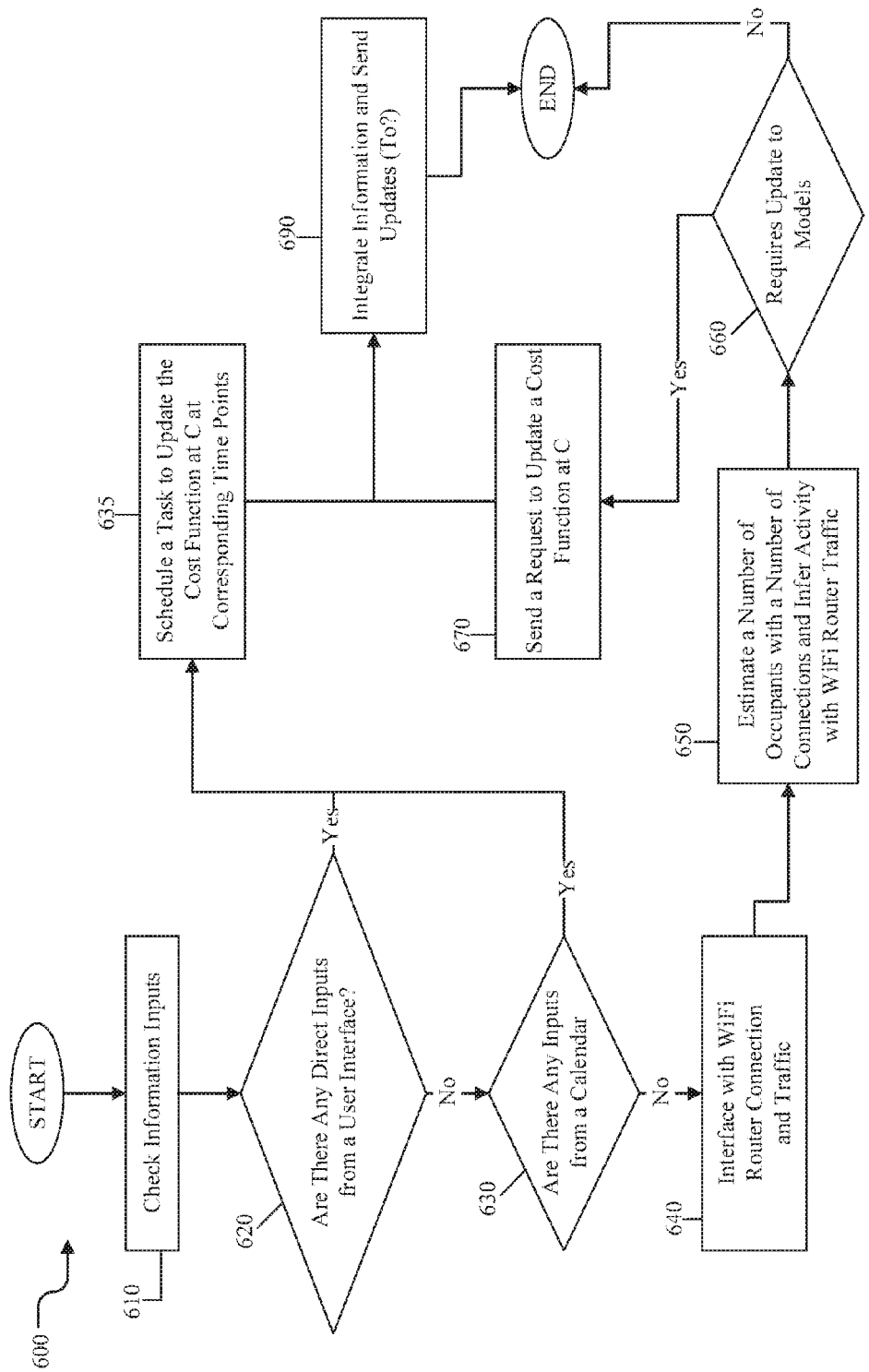
FIG. 6 is a flowchart of an embodiment implemented in a Human Behavior Analyzer Component of an EIB.

FIG. 6 is a flowchart of an embodiment of a method 600 that is implemented in a Human Behavior Analyzer Component, such as Human Behavior Analyzer Component 542, of an EIB, such as EIBs 115, 125, 135, 210, 280, and 420 and NE 300, when an input is received by the Human Behavior Analyzer Component. At step 610, the Human Behavior Analyzer Component checks the information inputs from various internal sources, such as controlled devices 430, and external sources, such as external EIBs 280 and 410. At decision step 620, the Human Behavior Analyzer Component moves to step 635 if there are direct inputs from a user interface shown via displays, such as displays 240 or smart devices, such as smart devices 256. At decision step 620, the Human Behavior Analyzer Component moves to step 630 if there are no direct inputs from the user interface. At decision step 630, the Human Behavior Analyzer Component moves to step 635 if there are inputs from a calendar associated with a user(s) that may interact with the controlled devices within an associated smart system. At decision step 630, the Human Behavior Analyzer Component moves to step 640 if there are no inputs from the calendar. At step 635, the Human Behavior Analyzer Component, schedules a task to update a cost function managed by the C Component, such as C Components 550 and 424, at time points corresponding to time inputs received via the user interface or read from the calendar and moves to step 690. At step 640, the Human Behavior Analyzer Component interfaces with the Wi-Fi Router Connection and reads the current traffic. At step 650, the Human Behavior Analyzer Component estimates a number of occupants using an associated smart system, such as smart systems 110, 120, 130, 205 and 405, based on a number of connections to the Wi-Fi and infers activity based on the Wi-Fi Router Traffic. At decision step 660, the Human Behavior Analyzer Component proceeds to step 670 if the inferred activity requires an update to the behavior models associated with the human behavior observed within the smart system. At step 670, the Human Behavior Analyzer Component sends a request the C Component to update a cost Function based on the updates to the human behavior models and moves to step 690. At step 690, the Human Behavior Analyzer Component integrates the received information into behavior models associated with the smart system and sends updates to the C Component.

Figure 7:
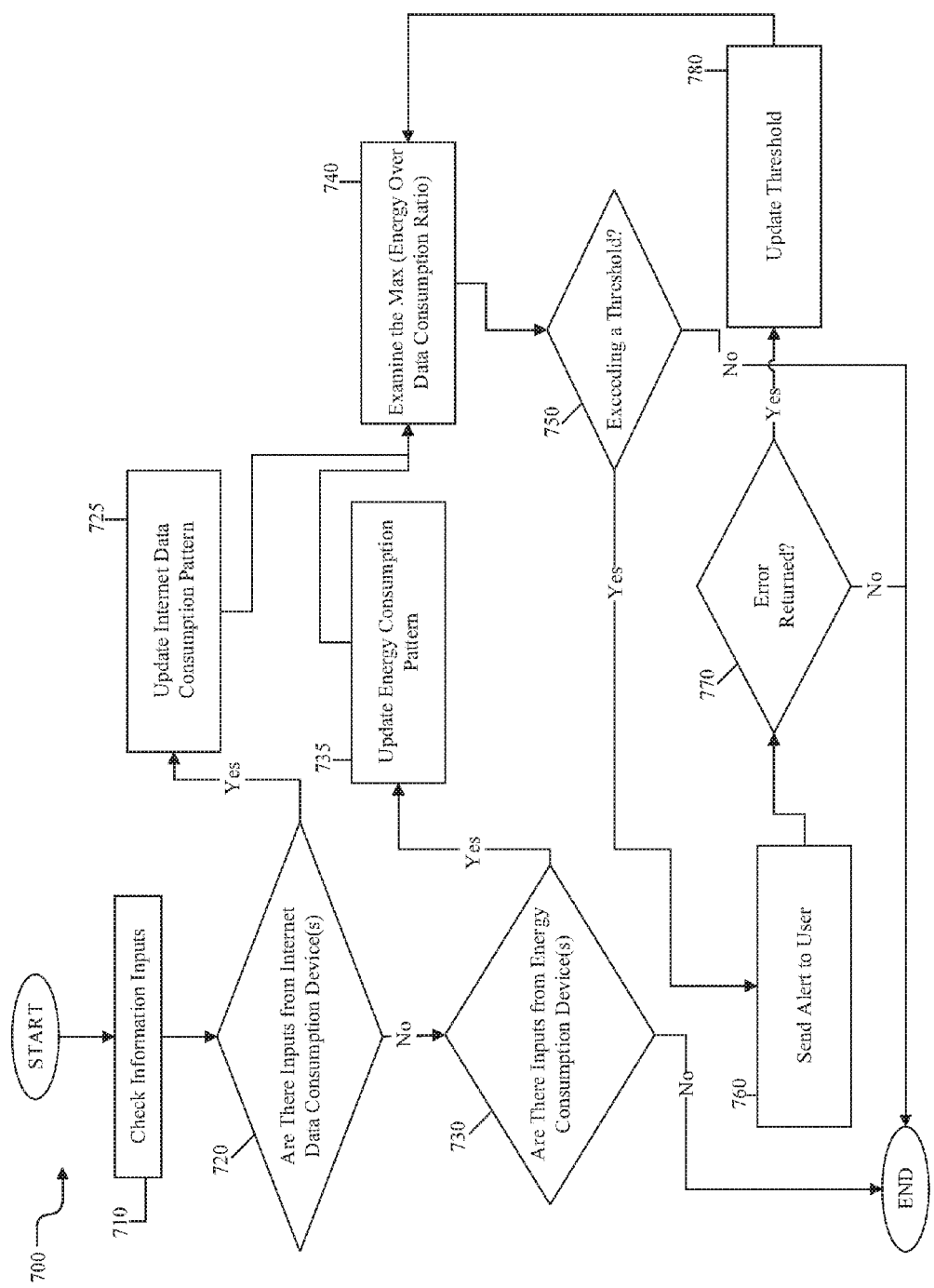
FIG. 7 is a flowchart of an embodiment implemented in a Data and Energy Flow Analyzer Component an EIB when an input is received by the Data and Energy Flow Analyzer Component.

FIG. 7 is a flowchart of an embodiment of a method 700 that is implemented in a Data and Energy Flow Analyzer Component, such as Data and Energy Flow Analyzer Component 544, of an EIB, such as EIBs 115, 125, 135, 210, 280, and 420 and NE 300, when an input is received by the Data and Energy Flow Analyzer Component. At step 710, the Data and Energy Flow Analyzer Component checks the information inputs from various internal sources, such as Controlled Devices 430, and external sources, such as external EIBs 280 and 410. At decision step 720, the Data and Energy Flow Analyzer Component proceeds to step 725 if inputs are received from internet data consumption devices, such as devices 250 and 252. At decision step 720, the Data and Energy Flow Analyzer Component proceeds to decision step 730 if there are no inputs from internet data consumption devices. At step 725, the Data and Energy Flow Analyzer updates an internet data consumption pattern with the received inputs and proceeds to step 740. The internet data consumption pattern is an internal model that contains historical data regarding the internet data consumed by the devices within an associated smart system. At decision step 730, the Data and Energy Flow Analyzer ends the process if there are no inputs from energy consumption devices. At decision step 730, the Data and Energy Flow Analyzer proceeds to step 735 if there are inputs from energy consumption devices. At step 735, the Data and Energy Flow Analyzer updates the Energy Consumption pattern with the received inputs and proceeds to step 740. The energy data consumption pattern is an internal model that contains historical data regarding the energy consumed by the devices within an associated smart system. At step 740, the Data and Energy Flow Analyzer examines a maximum energy over data consumption ratio based on a time theory data model over a determined period. At decision step 750, the Data and Energy Flow Analyzer proceeds to step 760 if the energy over data consumption ratio exceeds a threshold.

In an embodiment, the ratio is set by a command received via a user interface displayed on a display, such as displays 240, and/or a smart device, such as smart devices 256. At decision step 750, the Data and Energy Flow Analyzer ends the process if the energy over data consumption ratio does not exceed the threshold. At step 760, the Data and Energy Flow Analyzer sends an alert to a user interface displayed on a display, such as displays 240, and/or a smart device, such as smart devices 256 that the energy over data consumption ratio has exceeded the ratio. At decision step 770, the Data and Energy Flow Analyzer proceed to step 780 if the user interface returns an error. At decision step 770, the Data and Energy Flow Analyzer ends the process if no error is returned by the user interface. At step 780, the Data and Energy Flow Analyzer updates the threshold if the user interface returns an error and proceeds to step 740.

Figure 8:
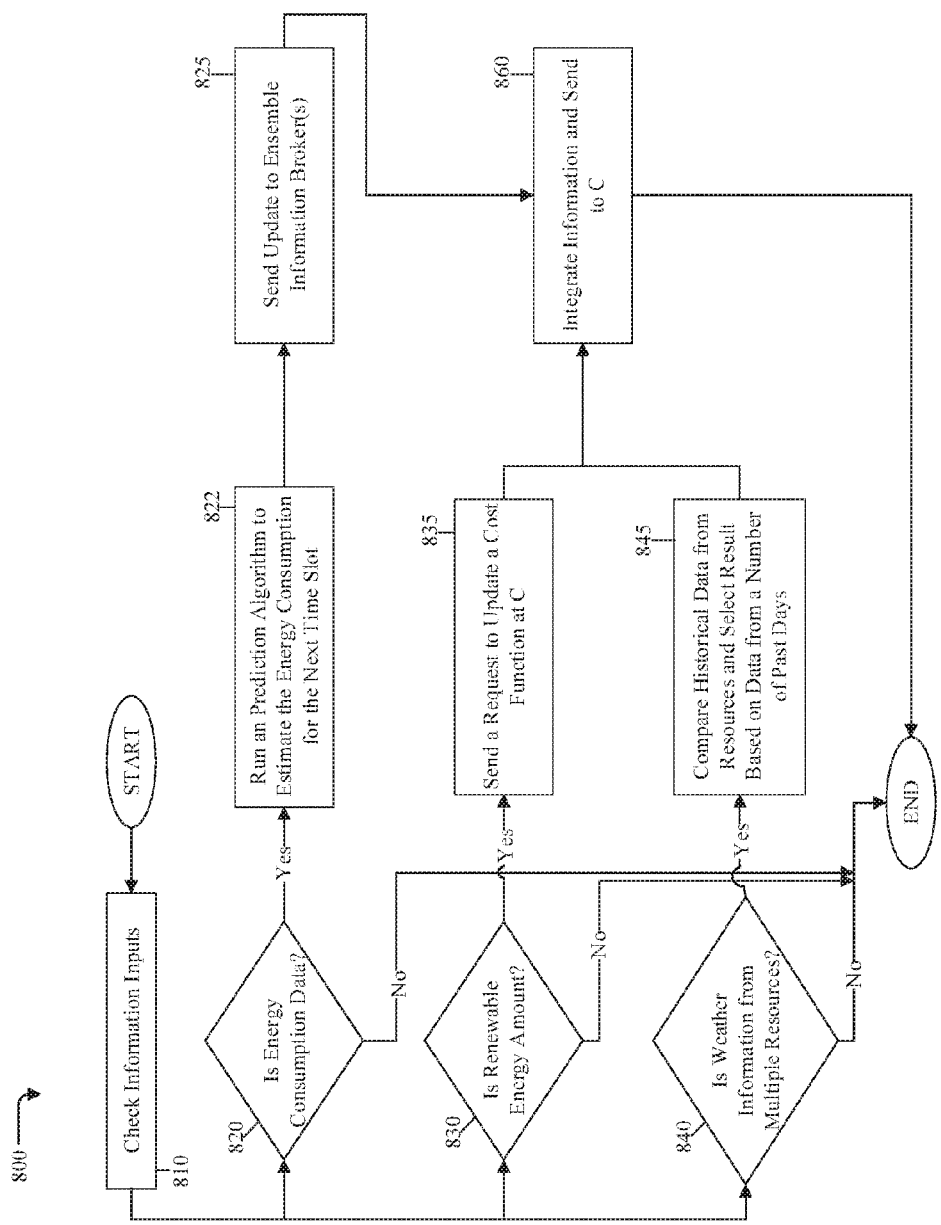
FIG. 8 is a flowchart of an embodiment implemented by a Predictor Component of an EIB when an input is received by the Predictor Component.

FIG. 8 is a flowchart of an embodiment of a method 800 that is implemented by a Predictor Component, such as Predictor Component 546, of an EIB, such as EIBs 115, 125, 135, 210, 280, and 420 and NE 300, when an input is received by the Predictor Component. At step 810, the Predictor Component checks the information inputs from various internal sources, such as Controlled Devices 430, and external sources, such as external EIBs 410, and proceeds to decision step 820, decision step 830, and decision step 840. At decision step 820, the process ends if the input data is not energy consumption data. At decision step 820, the Predictor Component proceeds to step 822 if the input data is energy consumption data. At step 822, the Predictor Component preforms a Prediction Algorithm to estimate the energy consumption for a next time slot and proceeds to step 825. In an embodiment, the Prediction Algorithm comprises time theory data. At step 825, the Predictor Component sends updates determined by the Prediction Algorithm to external EIB(s), such as External EIBs 280, connected to the EIB through an external gateway, such as external network gateway 230 and proceeds to step 860. At decision step 830, the process ends if the data inputs are a not renewable energy amount. At decision step 830, the Predictor Component proceeds to step 835 if the data inputs are a renewable energy amount. At step 835, the Predictor Component sends a request to a C Component, such as C Components 424 and 550, to update a cost function and proceeds to step 860. At decision step 840, the process ends if the data inputs do not contain weather information. At decision step 840, the Predictor Component proceeds to step 845 if the data inputs contain weather information. At step 845, the Predictor Component compares historical data from resources in an associated smart system and predicts a future value for energy consumption and/or generation within the associated smart system and for various devices within the associated smart system based on data from a number of past days from the historical data and current weather data. The Predictor Component then proceeds to step 860. At step 860, the Predictor Component integrates the received information and sends the updated data model data to the C Component and ends.

Figure 9:
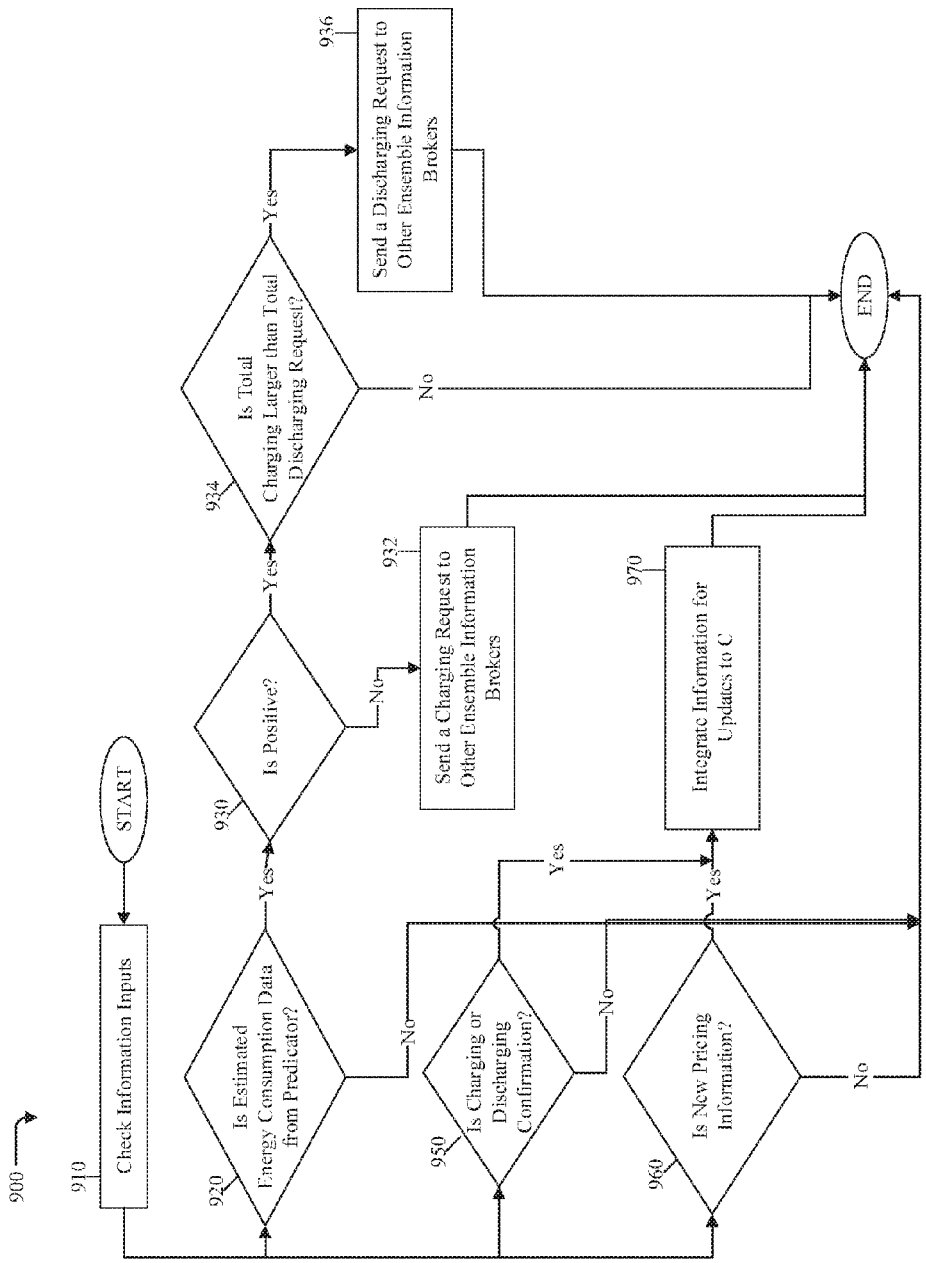
FIG. 9 is a flowchart of an embodiment implemented on an EIB when input data is received or sent to an external EIB connected to the EIB through an external gateway.

FIG. 9 is a flowchart of an embodiment of a method 900 that is implemented on an EIB, such as EIB 110 and 320 and NE 200, when input data is received or sent to an external EIB, such as External EIBs 280 and 410, connected to the EIB through an external gateway, such as external network gateway 230, within an energy storage internet architecture, such as energy storage internet architectures 100, 200, and 400. At step 910, the EIB checks the information inputs from various internal sources, such as controlled devices 330, and external sources, such as external EIBs 280 and 410, and proceeds to decision step 920, decision step 930, and decision step 940. At decision step 920, the process ends if the data input is not estimated energy consumption data received from a Predictor Component, such as Predictor Component 546. At decision step 920, the EIB proceeds to decision step 930 if the data input is estimated energy consumption data received from a Predictor Component, such as Predictor Component 546. At decision step 930, the EIB proceeds to step 932 if the estimated energy consumption data received from the Predictor Component is negative. At decision step 930, the EIB proceeds to decision step 934 if the estimated energy consumption data received from the Predictor Component is positive. At step 932, the EIB sends a charging request to the external EIBs because the energy consumption of an associated device is negative (e.g., the device is consuming more power than it is receiving and/or producing). At decision step 934, the EIB proceeds to step 936 if a total charging request is larger than a total discharging request for the associated smart system (e.g., the smarty system has a surplus of energy). At step 936, the EIB sends a discharging request to the external EIBs. At decision step 950, the process ends if the data inputs are a not a charging or a discharging confirmation. At decision step 950, the EIB proceeds to step 970 if the data inputs are a charging or a discharging confirmation. At decision step 960, the process ends if the data inputs are not for new pricing information. At decision step 960, the EIB proceeds to step 970 if the data inputs are for new pricing information. At step 970, the EIB integrates the charging or discharging confirmation and/or the new pricing information for updates to a C Component, such as C Components 424 and 550.

Figure 10:
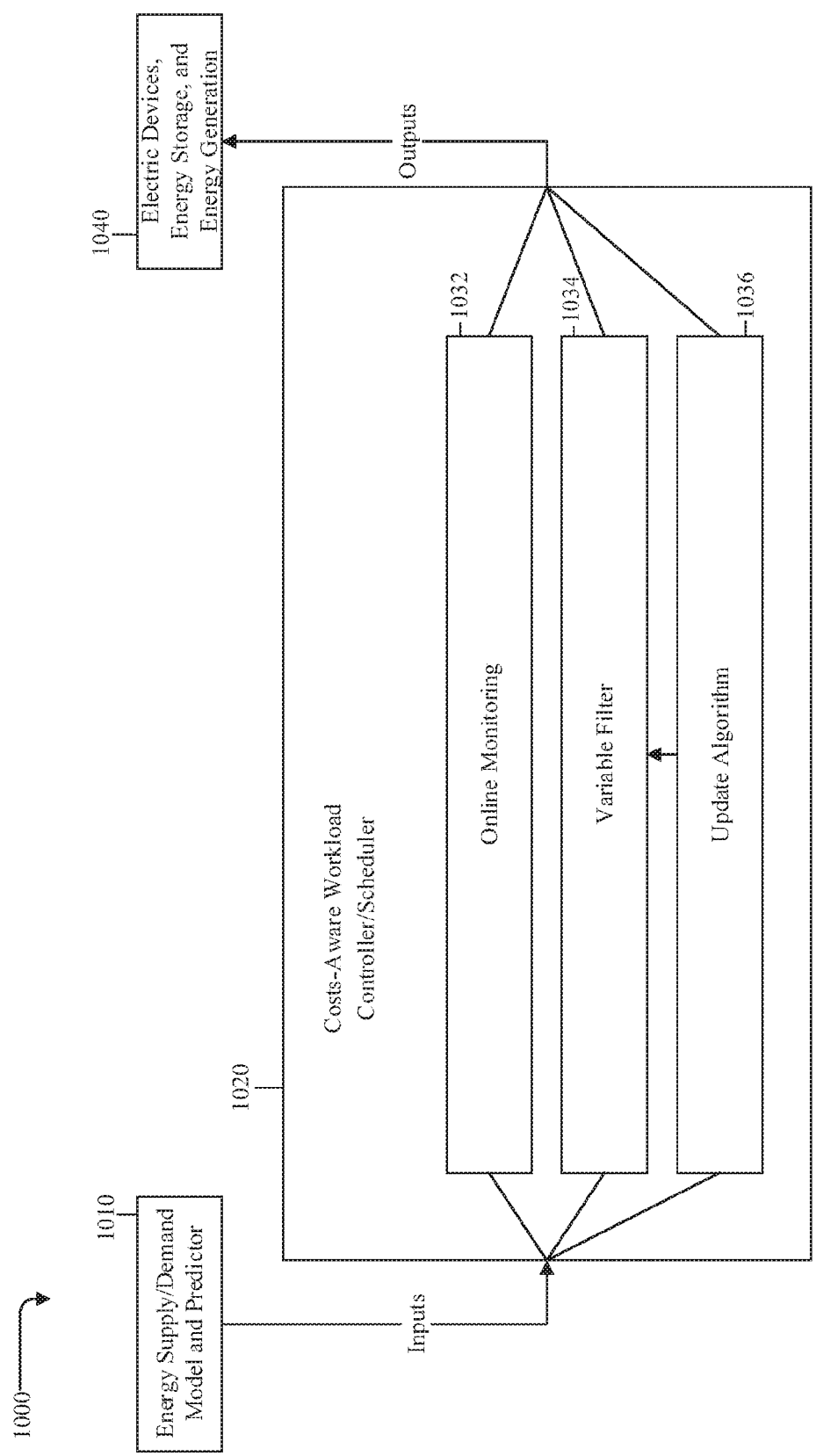
FIG. 10 a schematic diagram of an embodiment of a Costs-Aware Workload Controller/Scheduler (C) Component implemented on an EIB.

FIG. 10 a schematic diagram of an embodiment 1000 of a C Component 1020 implemented on an EIB, such as EIBs 115, 125, 135, 210, 280, and 420 and NE 300. C Component 1020 is substantially similar to C Component 424 and 550. C Component 1020 comprises Online Monitoring Component 1032, Variable Filter 1034, and Update Algorithm Component 1036, which are employed to recursively update cost and state functions associated with the smart system, such as smart system 110, 120, 130, 205, and 405, controlled by the EIB. In various embodiments, Online Monitoring Component 1032 monitors system dynamics and user inputs updates, Variable Filter 1034 selects coefficients for an adaptive filter(s), and Update Algorithm Component 1036 updates the adaptive filter(s) as new data arrives. C Component 1020 receives inputs from P Component 1010 and sends outputs to Electric Devices, Energy Storage, and Energy Generation 1040 controlled by the EIB. P Component 1010 is substantially similar to P Component 422. Electric Devices, Energy Storage, and Energy Generation 1040 are substantially similar to electronic devices 250, energy storage devices 254, and energy generation devices 252. In various embodiments, C Component 1020 generates outputs based on an online learning algorithm and a pattern detection method. The online learning algorithm may recursively find filter coefficients that minimize a weighted linear least square cost function. The pattern detection method monitors the energy and data streaming pattern and reports an alert to an assigned recipient when an anomaly occurs. In one example, each cost function can be represented as linear or non-linear function of decision variables (e.g., control outputs). However, the parameters in the cost function may be estimated using online computation algorithms.

Figure 11:
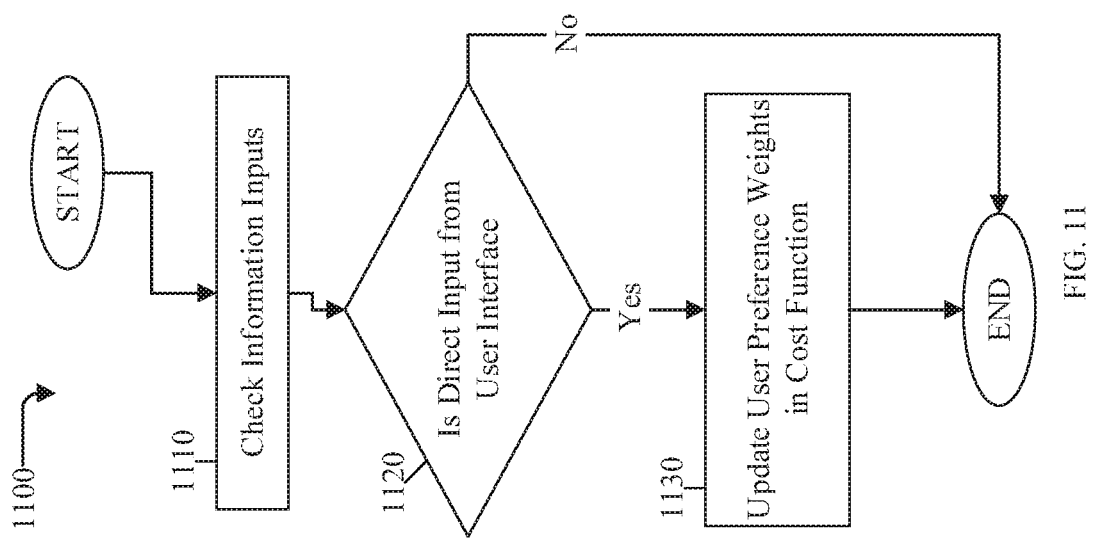
FIG. 11 is a flowchart of an embodiment implemented is on an EIB when input data is received from a user interface.

FIG. 11 is a flowchart of an embodiment of a method 1100 that is implemented on an EIB, such as EIBs 115, 125, 135, 210, 280, and 420 and NE 300, when input data is received from a user interface. At step 1110, the EIB checks the information inputs from various internal sources, such as controlled devices 430, and external sources, such as external EIBs 280 and 410. At decision step 1120, the EIB proceeds to step 1130 if the inputs are Direct Inputs from a User Interface displayed on, for example, a display, such as displays 240, or a smart device, such as smart devices 256. At step 1130, the EIB updates the cost function associates with the associated smart system with the inputs. In an embodiment, the updates to the cost function may include user preferences, which are coefficients or implied coefficients in the cost function.

Figure 12:
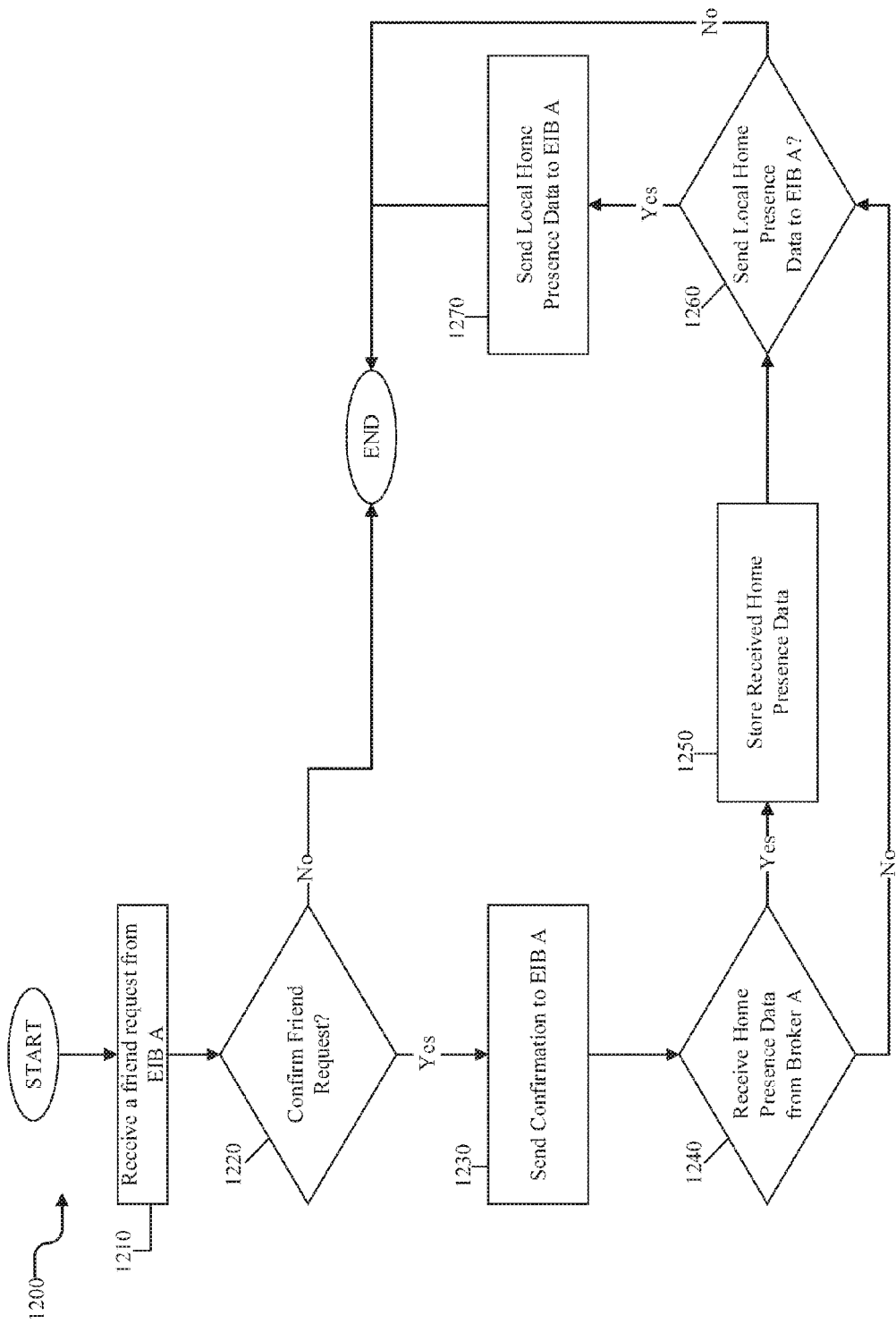
FIG. 12 is a flowchart of an embodiment implemented by an EIB within a data and energy storage internet architecture when the EIB receives a friend request from another EIB implemented within the data and energy storage internet.

FIG. 12 is a flowchart of an embodiment of a method 1200 implemented by an EIB, such as EIBs 115, 125, 135, 210, 280, and 420 and NE 300, within a data and energy storage internet architecture, such as energy storage internet architectures 100, 200 and 400, when the EIB receives a friend request from a remote EIB (EIB A in the disclosed embodiment) within the data and energy storage internet. At step 1210, the local EIB receives a friend request from the remote EIB. At decision step 1220, the process ends if the local EIB rejects/denies the friend request. At decision step 1220, the local EIB proceeds to step 1230 if the local EIB confirms/accepts the friend request. At step 1230, the local EIB sends a response to remote EIB confirming the friend request. At decision step 1240, the local EIB proceeds to step 1250 if the local EIB receives human presence data from the remote EIB. At decision step 1240, the local EIB proceeds to decision step 1260 if the local EIB does not receive human presence data from the remote EIB. In various embodiments, human presence data is information collected by an EIB, such as EIBs 115, 125, 135, 210, 280, and 420 and NE 300, regarding the interactions of a person(s) with devices within an associated smart system. At step 1250, the local EIB stores the received human presence data. At decision step 1260, the process ends if the local EIB determines to not send the local human presence data to the remote EIB. At decision step 1260, the local EIB proceeds to step 1270 if the local EIB determines to send the human presence data regarding user interaction with devices within an assigned smart system (i.e., the local human presence data) to the remote EIB. At step 1270, the local EIB sends the local human presence data to the remote EIB.

Figure 13:
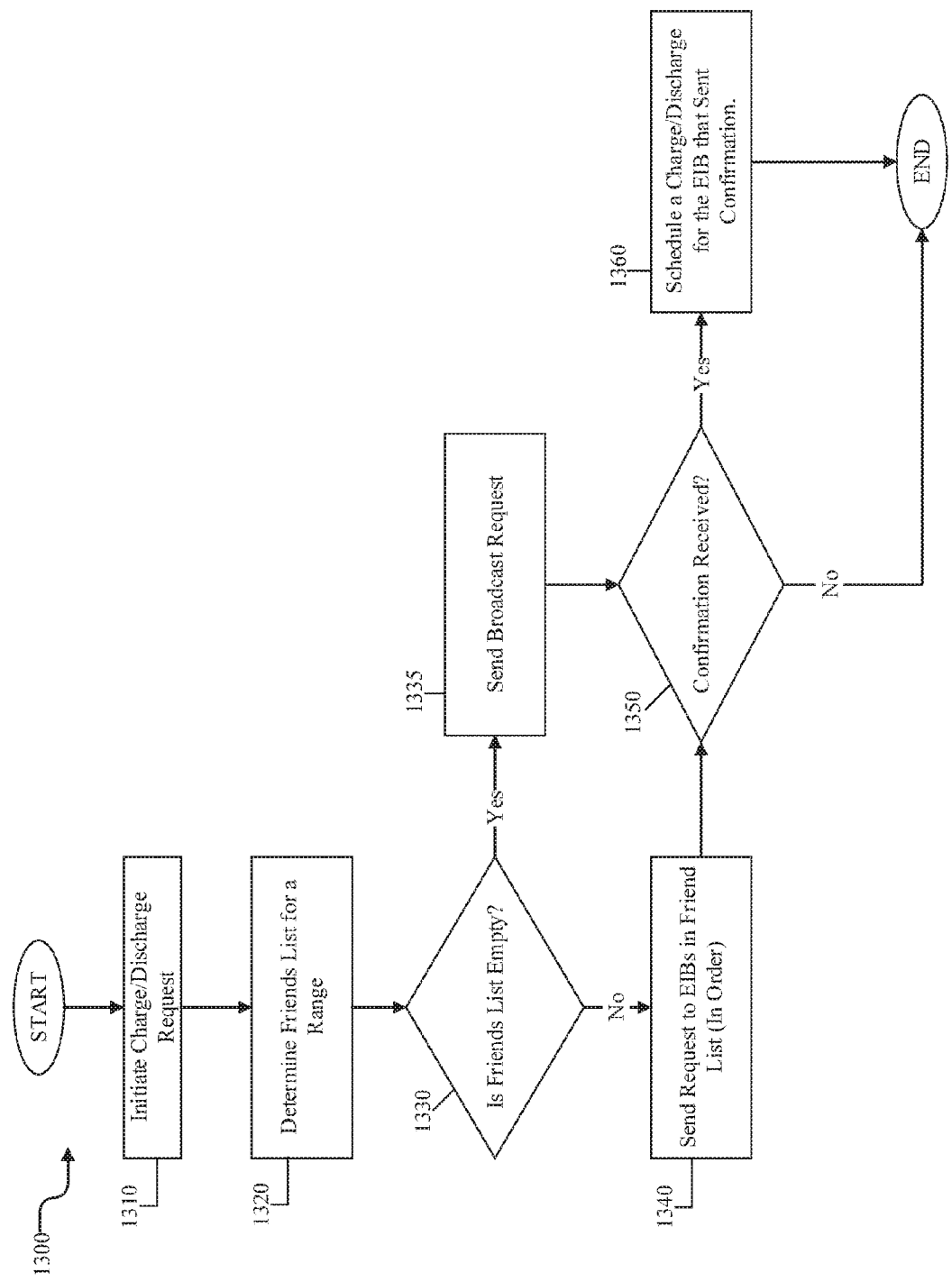
FIG. 13 is a flowchart of an embodiment implemented by an EIB within a data and energy storage internet architecture when the EIB initiates a charge or a discharge request.

FIG. 13 is a flowchart of an embodiment of a method 1300 implemented by an EIB, such as EIBs 115, 125, 135, 210, 280, and 420 and NE 300, within a data and energy storage internet architecture, such as energy storage internet architectures 100, 200, and 400, when the EIB initiates a charge or a discharge request. In step 1310, the EIB initiates a charge or a discharge request. In various embodiments a charge request is a request for energy for devices within an associated smart system, such as smart systems 110, 120, 130, 205, and 405, and a discharge request is an announcement that there is a surplus of energy available to transfer from devices within an associated smart system. At step 1320, the EIB determines a friend list based on an analysis of the stored human presence data received from other EIBs that have been accepted as friend connections by the EIB. In an embodiment, the friend list is ordered based on the established EIB friend connections that are most likely to satisfy the request, which is based on the analysis of the received human presence data. For example, the EIB may determine that a friend EIB is likely to have extra energy capacity to satisfy a charge request based on a likelihood that users of the smart system associated with the friend EIB are not using the energy provided to/by the associate smart system. In an embodiment, a value is placed on the determined likelihood of an established friend connection EIB satisfying the request and the elements of the friend list are then ordered by the value. At decision step 1330, the EIB proceeds to step 1335 if the determined friend list is empty. At decision step 1330, the EIB proceeds to step 1340 if the determined friend list is not empty. At step 1335, the EIB broadcasts the charge or the discharge request to all EIBs within the data and energy storage internet and proceeds to decision step 1350. In an alternative embodiment at step 1335, the EIB broadcasts the charge or the discharge request to only EIBs within the data and energy storage internet that have been established as friend connections and proceeds to decision step 1350. At step 1340, the EIB sends the charge or discharge to the EIB in the ordered list one at a time until a confirmation is received or a determined period of time has passed between messages. At decision step 1350, the EIB proceeds to step 1360 if a confirmation is received. At decision step 1350, the process ends if no confirmation is received. In an embodiment if a charge or a discharge request was broadcast, the EIB proceeds to step 1360 when a first confirmation is received; subsequent confirmations received by the EIB are ignored. At step 1360, the EIB schedules a charge or a discharge, corresponding to the type of request, for the EIB that sent the confirmation.

In an embodiment, an EIB, such as EIBs 115, 125, 135, 210, 280, and 420 and NE 300, implemented within a data and energy storage internet architecture, such as energy storage internet architectures 100, 200, and 400, may determine a friend list to employ to initiate a charge or discharge via a Friend Indexing algorithm. This Friend Indexing algorithm sorts all the EIBs that have been established as a friend connection, according to owner presence information received from each broker for a next time slot T. In an embodiment, the Friend Indexing algorithm determines which of the EIBs that have been established as a friend connection potentially has the most available resource and ranks the EIBs accordingly. In an embodiment, a Friend Indexing algorithm may be represented as:

```
Friend Indexing (present during time slot)
    Friend_Indexing_Algorithm(Friend_Set)
        if size(Friend_Set) == 1
            return Friend_Set
        else
            read presence data for Friend_Set in the next T time slot and save
to Presence matrix;
        for i = 1: size(Friend_Set)
            Friend_Index = T – num(zeros in Presence(i, :));
        end
        sort Friend_Set in descending order of Friend_Index;
``` where Friend_Set includes all the EIBs that have been established as a friend connection; the Presence Matrix is a 0, 1 matrix indicating the presence info for each time slot; where both T and the length of time slot are parameters that may be configured to according to a system setup; and where sorting of the Friend_Set checks the presence information of each row of Presence matrix for each friend and calculates the index number.

In an embodiment, an EIB, such as EIBs 115, 125, 135, 210, 280, and 420 and NE 300, implemented within a data and energy storage internet architecture, such as energy storage internet architectures 100, 200, and 400, may determine whether to trade energy among EIBs that are not established as a friend connection based on a point-based credit scheme. In an embodiment, a point-based credit scheme employed by an EIB, such as EIBs 115, 125, 135, 210, 280, and 420 and NE 300, is represented as the following algorithm:

```
Energy_Trading_Algorithm(Ch_Broker, Dis_Broker, Ch_Amount,
Dis_Amount)
    //Checks if have enough points
        if Point (Dis_Broker)+Point_Algorithm_Negative(Dis_Amount,
        t) < 0
        // to check the eligibility of EIB, which requests to discharge from
        other EIBs.
        report "ineligible";
        // sort the discharge requesting brokers in descending order of points
        S_Dis_Broker = Sort_Descent_Order(Point (Dis_Broker));
        loop i =1 : size (S_Dis_Broker)
        // assign charge requesting brokers to discharge requesting brokers
        // update points information of requesting fulfilled brokers
            find min(Ch_Amount(j)) where min(Ch_Amount(j)) >=
            Dis_Amount(i);
            assign Ch_Broker(j) to S_Dis_Broker(i);
            Point (Ch_Broker(j) = Point_Algorithm_Positve (Ch_Amount(j),
t) + Point(Ch_Broker(j));
            Point (Dis_Broker(i)) = Point_Algorithm_Negative
(Dis_Amount(i), t) + Point(Dis_Broker(i));
            delete Ch_Broker(j);
            exit loop if Ch_Broker is empty
Point_Algorithm_Positive (Ch_Amount, t)
        return weight (t) * Ch_Amount * Point_Unit;
Point_Algorithm_Negative(Dis_Amount, t)
        return weight (t) * Dis_Amount * Point_Unit;
``` where Ch_Broker is a list of EIBs that requests to charge its energy to other EIBs; where Ch_Amount is a list of values for corresponding charging amounts; where Dis_Broker is a list of EIBs that request to discharge energy from other EIBs; where Dis_Amount is a list of values for corresponding discharging amounts; where the parameters (Ch_Broker. Dis_Broker, Ch_Amount. Dis_Amount) are a matrix comprising a list of EIBs that have requested a trading of energy within a time period; where Point_Algorithm_Negative calculates the points that need to be deducted from the existing points of the discharging requesting EIB; where Point_Algorithm_Positive calculates the points that need to be awarded to the charging requesting EIB; and where weight (t) is a weight function, with values ranging from 0.5 to 1.5; when t is a peak hour for power consumption, weight (t) approximates to 1.5; when t is a trough (i.e., lowest point) hour for power consumption, weight(t) approximate to 0.5.

Figure 14:
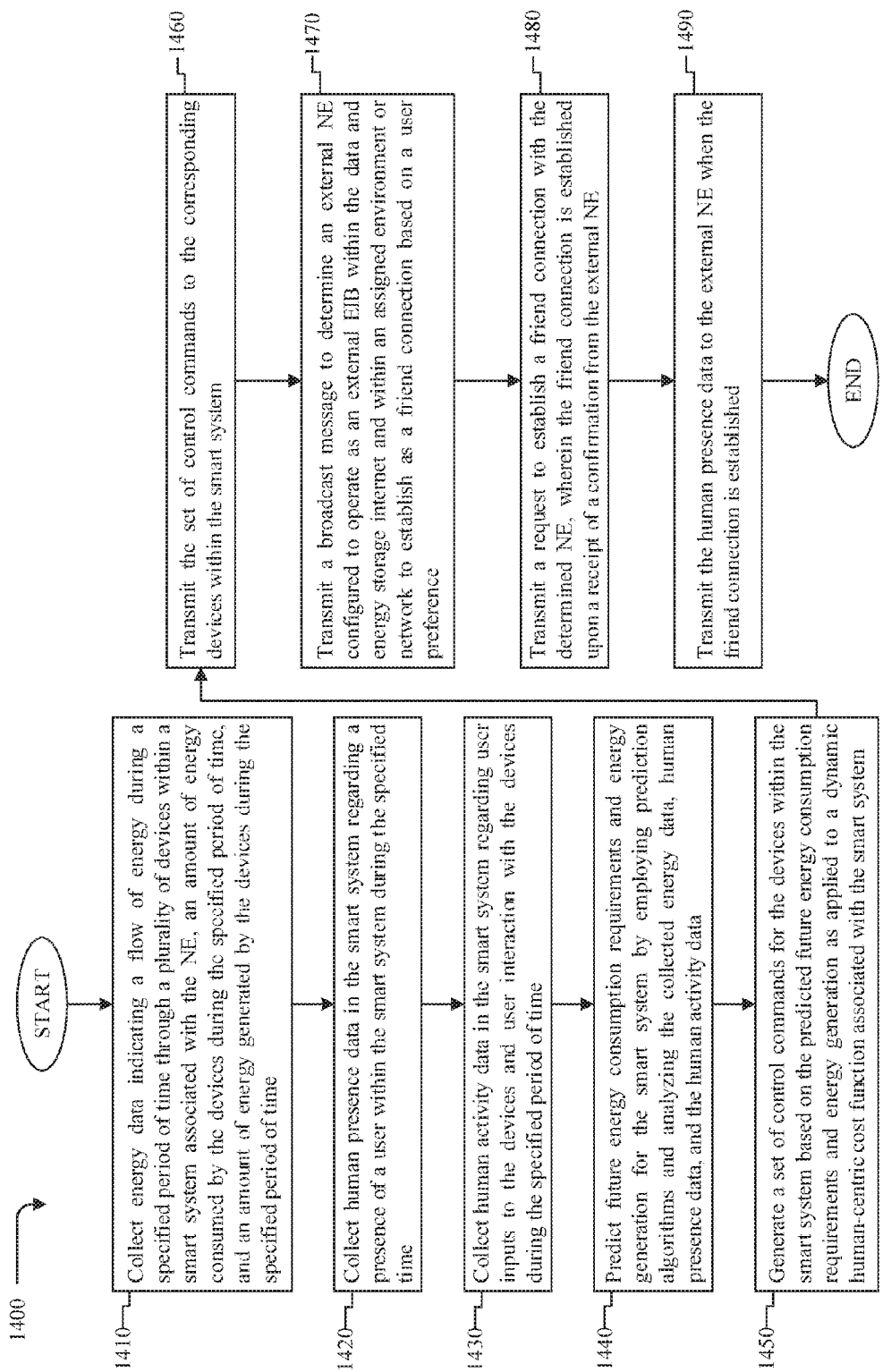
FIG. 14 is a flowchart of an exemplary embodiment of a method employed by an EIB implemented within a data and energy storage internet architecture to determine a set of external NEs configured as EIBs that may provide energy when a smart system associated with the EIB requires energy for devices within the smart system.

FIG. 14 is a flowchart of an exemplary embodiment of a method 1400 employed by an EIB, such as EIBs 115, 125, 135, 210, 280, and 420 and NE 300, implemented within a data and energy storage internet architecture, such as energy storage internet architectures 100, 200, and 400, to collect energy data, human presence data, and human activity data, to generate and transmit a set of control commands for devices within an associated smart system EIB through a prediction of future energy consumption requirements and energy generation of the devices within the associated smart system, and to determine and establish friend connections with external NEs with the energy storage internet architecture. At step 1410, the EIB collects energy data indicating a flow of energy during a specified period of time through a plurality of devices within a smart system associated with the NE, an amount of energy consumed by the devices during the specified period of time, and an amount of energy generated by the devices during the specified period of time. At step 1420, the EIB collects human presence data in the smart system regarding a presence of a user within the smart system during the specified time. At step 1430, the EIB collect human activity data in the smart system regarding user inputs to the devices and user interaction with the devices during the specified period of time. At step 1440, the EIB predicts future energy consumption requirements and energy generation for the smart system by employing prediction algorithms and analyzing the collected energy data, human presence data, and the human activity data. At step 1450, the EIB generates a set of control commands for the devices within the smart system based on the predicted future energy consumption requirements and energy generation as applied to a dynamic human-centric cost function associated with the smart system. At step 1460, the EIB transmits the set of control commands to the corresponding devices within the smart system. At step 1470, the EIB transmits the set of control commands to the corresponding devices within the smart system. At step 1480, the EIB transmits the set of control commands to the corresponding devices within the smart system. At step 1490, the EIB transmits the set of control commands to the corresponding devices within the smart system.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A distributed system comprising:
a plurality of network elements (NEs) configured to operate as Ensemble Information Brokers (EIBs) within a distributed data and energy storage internet architecture, wherein each NE is configured to:
collect device data regarding a flow of energy during a specified period of time through a plurality of devices within a smart system associated with the NE, an amount of energy and data consumed by the devices during the specified period of time, and an amount of energy and data generated by the devices during the specified period of time;
collect human presence data in the smart system regarding a presence of a user within the smart system during the specified period of time;
collect human activity data in the smart system regarding user inputs to the devices and user interaction with the devices during the specified period of time;
determine future energy and data consumption and generation requirements for the smart system by applying prediction algorithms to the device data, the human presence data and the human activity data;
generate a set of control commands for the devices within the smart system based on the future energy and data consumption and generation requirements as applied to a dynamic human-centric cost function associated with the smart system, wherein the dynamic human-centric cost function adapts to weighted objective metrics according to the human presence data, human activity data, and user defined preference levels for the smart system;
transmit the set of control commands to the corresponding devices within the smart system;
transmit a broadcast message to determine an external NE within an assigned environment or network and within the distributed data and energy storage internet architecture to establish as a friend connection based on a user preference;
transmit a request to establish the friend connection with the external NE, wherein the friend connection is established upon a receipt of a confirmation from the external NE;
transmit the human presence data to the external NE when the friend connection is established; and
trade resources with both the external NE having the friend connection and external NEs without established friend connections.

2. The distributed system of claim 1, wherein each NE is further configured to transmit a heartbeat message periodically to maintain a connection status with the external NE when the friend connection is established.

3. The distributed system of claim 1, wherein each NE is further configured to receive external environment presence data from the external NE when the friend connection is established, and wherein the external environment presence data indicates an interaction of a plurality of external users with a plurality of external devices within external smart systems associated with the external NE.

4. The distributed system of claim 1, wherein each NE is further configured to:
receive a request for energy or data storage at a specified time from a second external NE;
determine an eligibility of a second external smart system associated with the second external NE based on an eligibility algorithm determined by whether the second external NE has been established as a friend connection; and
send a command to an electric producing device within the smart system to cause the electric producing device to provide an amount of energy or data generation satisfying the request for energy or data storage to the second external smart system at the specified time upon determining that the second external smart system is eligible to receive the amount of energy or data.

5. The distributed system of claim 4, wherein the eligibility algorithm is a point-based credit scheme when the second external NE is not established as a friend connection, wherein the point-based credit scheme compares a sent amount of energy or data sent to an external smart system and a received amount of energy or data received from the external smart system, and wherein the point-based credit scheme comprises a weight function comprising a weight value determined based on a temporal distance between the specified time and a peak time for energy or data consumption within the smart system assigned to the NE.

6. The distributed system of claim 4, wherein the eligibility algorithm is an established friend scheme when the second external NE is established as a friend connection, and wherein the established friend scheme determines that the second external smart system is eligible to receive the amount of energy or data when the second external NE is established as a friend connection.

7. The distributed system of claim 1, wherein the dynamic human-centric cost function comprises a human-centric multimodal representation of a weighted sum of an energy cost function and a user productivity function, wherein the energy cost function is a representation of an operating status of the devices, and wherein the user productivity function is a representation of a human comfort level and a human productivity level within the smart system and comprises a noise function, a cool function, a warm function, a fresh function, and a humidity function each regarding an operating status of the devices.

8. The distributed system of claim 7, wherein each NE is further configured to provide an interface to alter or enter values employed within the energy cost function and the user productivity function.

9. A network element (NE) configured to operate as an Ensemble Information Broker (EIB) within a distributed data and energy storage internet architecture, the NE comprising:
a processor configured to:
collect device data regarding a flow of energy during a specified period of time through a plurality of devices within a smart system associated with the NE, an amount of energy and data consumed by the devices during the specified period of time, and an amount of energy and data generated by the devices during the specified period of time;
collect human presence data in the smart system regarding a presence of a user within the smart system during the specified period of time;
collect human activity data in the smart system regarding user inputs to the devices and user interaction with the devices during the specified period of time;
predict future energy and data consumption and generation requirements for the smart system by applying prediction algorithms to the device data, the human presence data, and the human activity data; and
generate a set of control commands for the devices within the smart system based on the predicted future energy and data consumption and generation requirements as applied to a dynamic human-centric cost function associated with the smart system that adapts to weighted objective metrics according to the human presence data, human activity data, and user defined preference levels for the smart system, wherein the dynamic human-centric cost function comprises a human-centric multimodal representation of a weighted sum of an energy cost function and a user productivity function, wherein the energy cost function is a representation of an operating status of the devices, and wherein the user productivity function is a representation of a human comfort level and a human productivity level within the smart system and comprises a noise function, a cool function, a warm function, a fresh function, and a humidity function each regarding an operating status of the devices;
a transmitter coupled to the processor and configured to transmit the set of control commands to the corresponding devices within the smart system and to transmit the human presence data to an external NE; and
an external gateway coupled to the transmitter, the external gateway configured to facilitate trading of resources with both the external NE having a friend connection and external NEs without established friend connections.

10. The NE of claim 9, wherein the set of control commands is generated based further according to human-centric optimization objectives comprising a reduction of energy cost within the smart system and optimization of a productivity of the user within the smart system.

11. The NE of claim 9, wherein the human activity data comprises a time of day and a number of hours a user has interacted with each of the devices in the smart system.

12. The NE of claim 9, wherein the dynamic human-centric cost function is updated by weighting the dynamic human-centric cost function according to user preferences received from a user interface coupled to the NE and within the smart system.

13. The NE of claim 9 further comprising:
a receiver coupled to the processor and configured to receive, from a plurality of external NEs configured to operate as external EIBs within the distributed data and energy storage internet architecture that have established the friend connection, external environment presence data indicating an interaction of a plurality of external users with a plurality of external devices within a plurality of external smart systems associated with each of the external NEs,
wherein the processor is further configured to determine a subset of the external NEs based on an analysis of the external environment presence data indicating a likelihood of each of the external smart systems comprising sufficient surplus power or data storage to satisfy a request for energy or data storage from the smart system associated with the NE, and
wherein the transmitter is further configured to transmit the request for energy or data storage to the subset of the external NEs.

14. The NE of claim 13, wherein the friend connection for one of the external NEs is established based on the NE receiving a request, via the receiver, from the one of the external NEs to establish the friend connection and the NE sending a confirmation, via the transmitter, that the friend connection has been established.

15. The NE of claim 13, wherein the transmitter is further configured to transmit the human presence data to the external NEs when a friend connection has been established with the external NEs.

16. The NE of claim 9 further comprising:
a receiver coupled to the processor and configured to receive, from an external NE configured to operate as an external EIB within the distributed data and energy storage internet architecture, a request for energy or data storage at a specified time;
determine an eligibility of an external smart system assigned to the external NE based on a point-based credit scheme comparing a sent amount of energy or data sent to an external smart system assigned to the external NE and a received amount of energy or data received from the external smart system, wherein the point-based credit scheme comprises a weight function comprising a point value determined based on a temporal distance between the specified time and a peak time for energy or data consumption within the smart system assigned to the NE; and
send a command to an electric producing device within the smart system to cause the electric producing device to provide an amount of energy or data generation satisfying the request for energy or data storage to the external smart system at the specified time upon determining that the external smart system is eligible to receive the amount of energy or data.

17. A method implemented in a network element (NE) configured to operate as an Ensemble Information Broker (EIB) within a distributed data and energy storage internet architecture, the method comprising:
collecting energy data indicating a flow of energy during a specified period of time through a plurality of devices within a smart system associated with the NE, an amount of energy consumed by the devices during the specified period of time, and an amount of energy generated by the devices during the specified period of time;
collecting human presence data in the smart system regarding a presence of a user within the smart system during the specified period of time;
collecting human activity data in the smart system regarding user inputs to the devices and user interaction with the devices during the specified period of time;
predicting future energy consumption requirements and energy generation for the smart system by employing prediction algorithms and analyzing the collected energy data, the human presence data, and the human activity data;
generating a set of control commands for the devices within the smart system based on the predicted future energy consumption requirements and energy generation as applied to a dynamic human-centric cost function associated with the smart system;
transmitting the set of control commands to the corresponding devices within the smart system;
transmitting a broadcast message to determine an external NE configured to operate as an external EIB within the distributed data and energy storage internet architecture and within an assigned environment or network to establish as a friend connection based on a user preference;
transmitting a request to establish the friend connection with the external NE, wherein the friend connection is established upon a receipt of a confirmation from the external NE;
transmitting the human presence data to the external NE when the friend connection is established; and
trading resources with both the external NE having the friend connection and external NEs without established friend connections.

18. The method of claim 17 further comprising receiving external human presence data indicating an interaction of a plurality of external users with a plurality of external devices within an external smart system associated with the external NE when the friend connection is established.

19. The method of claim 18 further comprising:
determining to include the external NE within a set of external NEs based on an analysis of the external human presence data indicating a likelihood of the external smart system comprising sufficient surplus power or data storage to satisfy a request for energy or data storage from the smart system associated with the NE, and
transmitting the request for energy or data storage to the external NE when the external NE is included in the set of external NEs.

20. The method of claim 17 further comprising:
receiving, from an external NE configured to operate as an external EIB within the distributed data and energy storage internet architecture, a request for energy or data storage at a specified time;

determining an eligibility of an external smart system assigned to the external NE based on a point-based credit scheme comparing a sent amount of energy or data sent to an external smart system assigned to the external NE and a received amount of energy or data received from the external smart system, wherein the point-based credit scheme comprises a weight function comprising a point value determined based on a temporal distance between the specified time and a peak time for energy or data consumption within the smart system assigned to the NE; and sending a command to an electric producing device within the smart system to cause the electric producing device to provide an amount of energy or data generation satisfying the request for energy or data storage to the external smart system at the specified time upon determining that the external smart system is eligible to receive the amount of energy or data.

* * * * *

UNITED STATES PATENT AND TRADEMARK OFFICE
CERTIFICATE OF CORRECTION

PATENT NO. : 10,496,049 B2
APPLICATION NO. : 14/970906
DATED : December 3, 2019
INVENTOR(S) : Lei Rao et al.

It is certified that error appears in the above-identified patent and that said Letters Patent is hereby corrected as shown below:

On the Title Page

Column 2, Other Publications, Lines 1-4 should read:
Katz, R.H., et al., "An information-centric energy infrastructure: The Berkeley view," Sustainable Computing: Informatics and Systems, journal homepage:www.elsevier.com/locate/suscom, vol. 1, Issue 1, 2011, pgs 7-22.

Signed and Sealed this
Twenty-eighth Day of January, 2020

Andrei Iancu
*Director of the United States Patent and Trademark Office*